US007236587B2

United States Patent
Zerressen

(10) Patent No.: US 7,236,587 B2
(45) Date of Patent: Jun. 26, 2007

(54) SYSTEMS AND METHODS FOR DETERMINING CRITICAL CIRCUIT DIVERSITY

(75) Inventor: Dieter Zerressen, Denver, CO (US)

(73) Assignee: Qwest Communications International Inc., Denver, CO (US)

(*) Notice: Subject to any disclaimer, the term of this patent is extended or adjusted under 35 U.S.C. 154(b) by 364 days.

(21) Appl. No.: 10/328,399

(22) Filed: Dec. 23, 2002

(65) Prior Publication Data

US 2004/0120513 A1    Jun. 24, 2004

(51) Int. Cl.
*H04L 12/28* (2006.01)
(52) U.S. Cl. .................. 379/414; 379/279; 370/255
(58) Field of Classification Search .......... 379/279, 379/209
See application file for complete search history.

(56) References Cited

U.S. PATENT DOCUMENTS 6,075,766 A * 6/2000 Croslin ................. 370/225

* cited by examiner

*Primary Examiner*—Sinh Tran
*Assistant Examiner*—Walter F Briney, III
(74) *Attorney, Agent, or Firm*—Townsend and Townsend and Crew LLP

(57) ABSTRACT

According to the invention, systems and methods are provided for analyzing the diversity of a set of critical telecommunication circuits. For example, according to one embodiment of the invention, a method is provided for analyzing the diversity of critical telecommunication circuits, the method comprising: determining a critical circuit set comprising a first critical circuit and a second critical circuit; identifying a first set of telecommunication resources associated with the first critical circuit; identifying a second set of telecommunication resources associated with the second critical circuit; and comparing the first set of telecommunication resources with the second set of telecommunication resources to determine whether the critical circuit set is diverse.

32 Claims, 29 Drawing Sheets

|   412  | 416 | 420 | 424 | 428 | 432    | 436    | 440                                                           |
|--------|-----|-----|-----|-----|--------|--------|---------------------------------------------------------------|
|        |     |     |     |     |        |        | SS7Wyoming ～444                                              |
| SS7    | 2   | N   | C   | 654 | MQD3KA7| MQD3JT2| CHYNWYMA03T_Cheyenne# ～448                                   |
| SS7    | 2   | N   | C   | 654 | MPJ3KF3| MPJ3KF2| CSPRWYMA03T_Casper#                                           |
| SS7    | 2   | N   | C   | 654 | MBM4YT3| MBM4YT4| CODYWYMADS0_Cody#no_div_avail_one_radio.                      |
| SS7    | 2   | N   | C   | 654 | MCQ4AE2| MCP4ZH7| DGLSWYMADS0_Douglas#                                          |
| SS7    | 2   | N   | C   | 654 | MZJ3VG8| MZJ3VG9| EVTNWYMADS0_Evanston#no_div_avail_5-7-02.                     |
| SS7    | 2   | N   | C   | 654 | MDT4FN5| MDT4FN4| GLTTWYMADS0_Gillette#no_div_avail_one_radio.                  |
| SS7    | 2   | N   | C   | 654 | MUZ3WL8| MUZ3WL9| GNRVWYMADS0_Green_River#TIRKS_wyc028017_dd_9-13_no_div_avail |
| SS7    | 2   | N   | C   | 654 | MAD4FP2| MAD4FP3| JCSNWYMADS0_Jackson#no_div_avail_radio_route                  |
| SS7    | 2   | N   | C   | 654 | MTN3UQ9| MTN3UQ8| LARMWYMADS0_Laramie#no_div_avail_collapsed_ring.              |
| SS7    | 2   | N   | C   | 654 | MUZ3UW9| MUZ3UX2| RCSPWYMADS0_Rock_Springs#                                     |
| SS7    | 2   | N   | C   | 654 | MUZ3UW7| MUZ3UW8| RVTNWYMADS0_Riverton#no_div_avail_radio_route.                |
| SS7    | 2   | N   | C   | 654 | MYX3VB2| MYX3VE3| RWLNWYMADS0_Rawlins#                                          |
| SS7    | 2   | N   | C   | 654 | MAL4SG8| MAL4SG9| SHRDWYMADS0_Sheridan#no_div_avail_radio_route_only.          |

Subject: CCD: Diversity Processor Message
Date: Tue, 29 Oct 2002 10:43:13 -0700 (MST)
From: Mynah Application ID <madmin@mynah.qwest.com>
   To: jsmith@qwest.com
   CC: tjohnson@qwest.com The following reports have been completed by the CCD: Diversity Processor, below is the URL for your report:

http://mynah:3000/dba/rpts/ss7/ss7Wyoming.html

```
CCD: Diversity Exception Report: SS7Wyoming - Browser                          _ □ X
File  Edit  View  Go  Communicator  Help
Back ▼  ⇧  🏠  🔍 Search  ⭐ Favorites  📀 Media  🖨  📁  🖨

File Name:    SS7Wyoming Diversity Exception Report      Run Date:  Tue Oct 29 10:43:12 MST 2002
┌─────────────────────────────────────────────────────────────────────────────────────┐
│ FILENAME: SS7Wyoming              TYPE: SS7    REGION: C      LATA: 654            │
│ COMMENT:  CHYNWYMA03T Cheyenne                                                      │
└─────────────────────────────────────────────────────────────────────────────────────┘

This comparison includes the following (2) Circuit Administration Codes (CACs). They are listed as follows:

CAC        CUSTOMER      CLO           CHNG   PEND         CIRCUIT
MQD3KA7    USWEST/GEW    WYM009527001    &      n     000 / DF42SLA / CHYNWYMA03T / 77 / CSPRWYMA00W
MQD3JT2    AE090761/C    WYM011687001    &      n     000 / DF24SLA / CHYNWYMA00W / 77 / CHYNWYMA03T

DIVERSE:  These circuits are diverse within the TIRKS database records.

┌─────────────────────────────────────────────────────────────────────────────────────┐
│ FILENAME: SS7Wyoming              TYPE: SS7    REGION: C      LATA: 654            │
│ COMMENT:  CSPRWYMA03T Casper                                                        │
└─────────────────────────────────────────────────────────────────────────────────────┘

This comparison includes the following (2) Circuit Administration Codes (CACs). They are listed as follows:

CAC        CUSTOMER      CLO           CHNG   PEND         CIRCUIT
MPJ3KF3    AE090040      WYM015455001    &      n     000 / DF24SLA / CHYNWYMA00W / 77 / CSPRWYMA03T
MPJ3KF2    AE090041      WYM015456001    &      n     000 / DF24SLA / CHYNWYMA00W / 77 / CSPRWYMA03T

DIVERSE:  These circuits are diverse within the TIRKS database records.

Document Done
```

| CCD: Diversity Exception Report: SS7Wyoming - Browser | _ □ X |
|---|---|
| File Edit View Go Communicator Help | |

Back ▸ 🏠 🗋 🔎 Search ☆ Favorites 🎧 Media 🖉 🖸 📇

FILENAME: SS7Wyoming    TYPE: SS7    REGION: C    LATA: 654

COMMENT: EVTNWYMADS0 Evanston no div avail 5-7-02.  ← 864

This comparison includes the following (2) Circuit Administration Codes (CACs). They are listed as follows:   — 868

| CAC | CUSTOMER | CLO | CHNG | PEND | CIRCUIT |
|---|---|---|---|---|---|
| MZJ3VG8 | AE102205 | WYM015448001 | & | n | 000 / DF25SLA / CHYNWYMA00W / 77 / EVTNWYMADS0 |
| MZJ3VG9 | AE102204/R | WYM012892001 | & | n | 000 / DF25SLA / CSPRWYMA00W / 77 / EVTNWYMADS0 |

This comparison found that the following (3) cables are in diversity violation:

| | TERM A | TERM B | CABLE |
|---|---|---|---|
| 872A | EVTNWYMA | URIEWYMAAH01 | 60 |
| 872B | GNRVWYMA | RCSPWYMA | 60 |
| 872C | GNRVWYMA | URIEWYMAAH01 | 60 |

This comparison found that the following (2) facilities are in diversity violation:

| | TERM A | TERM B | FACILITY | FAC TYPE |
|---|---|---|---|---|
| 876A | GNRVWYMA | RCSPWYMA | 101 | OC12 |
| 876B | GNRVWYMA | RCSPWYMA | 101 | OC12 |

This comparison found that the following (1) pieces of equipment are in diversity violation:

| | LOCATION | EQUIPMENT CODE | RELAY RACK# |
|---|---|---|---|
| 880 | EVTNWYMA | D4CB31HBRA | 01110.02 |

Document Done

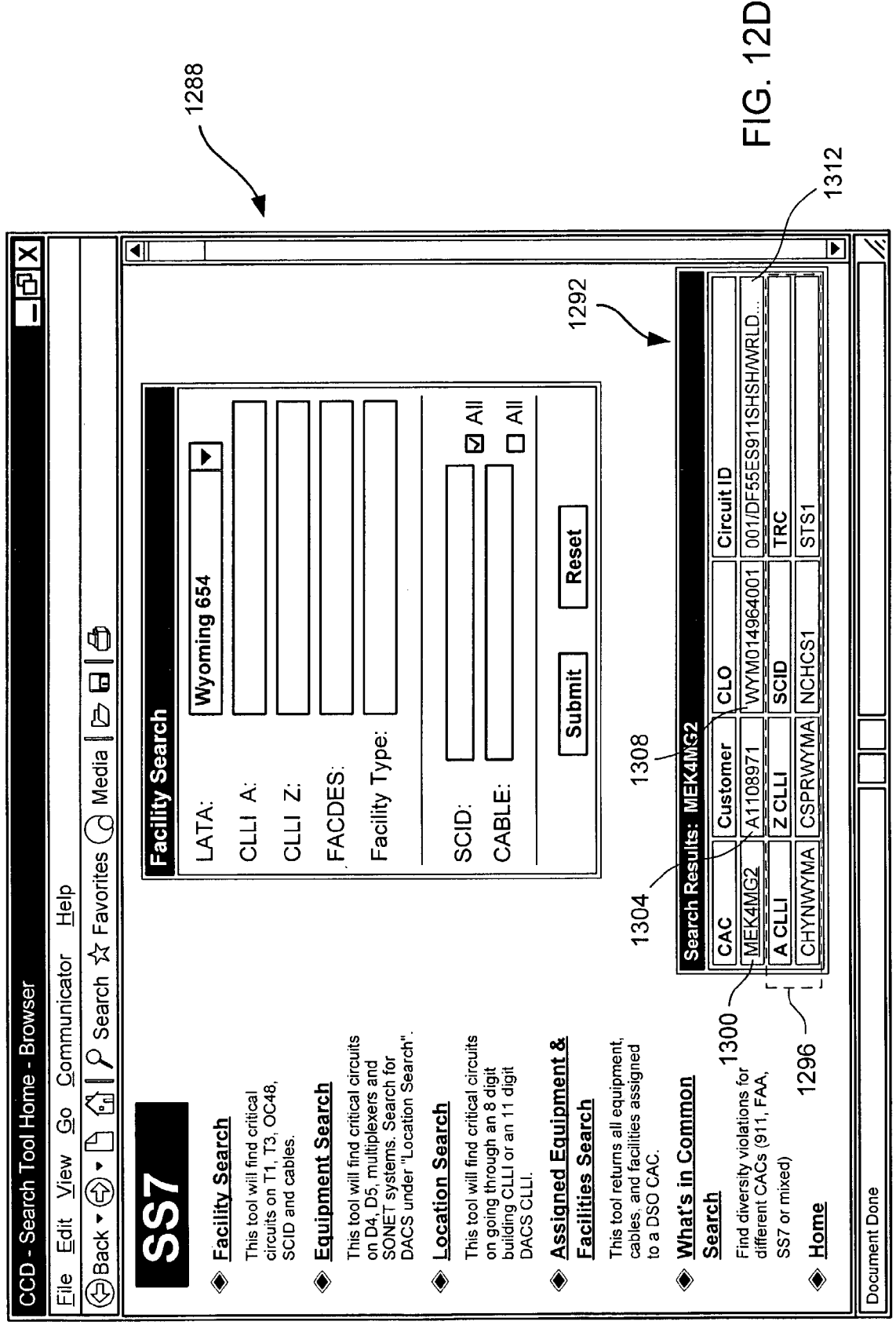

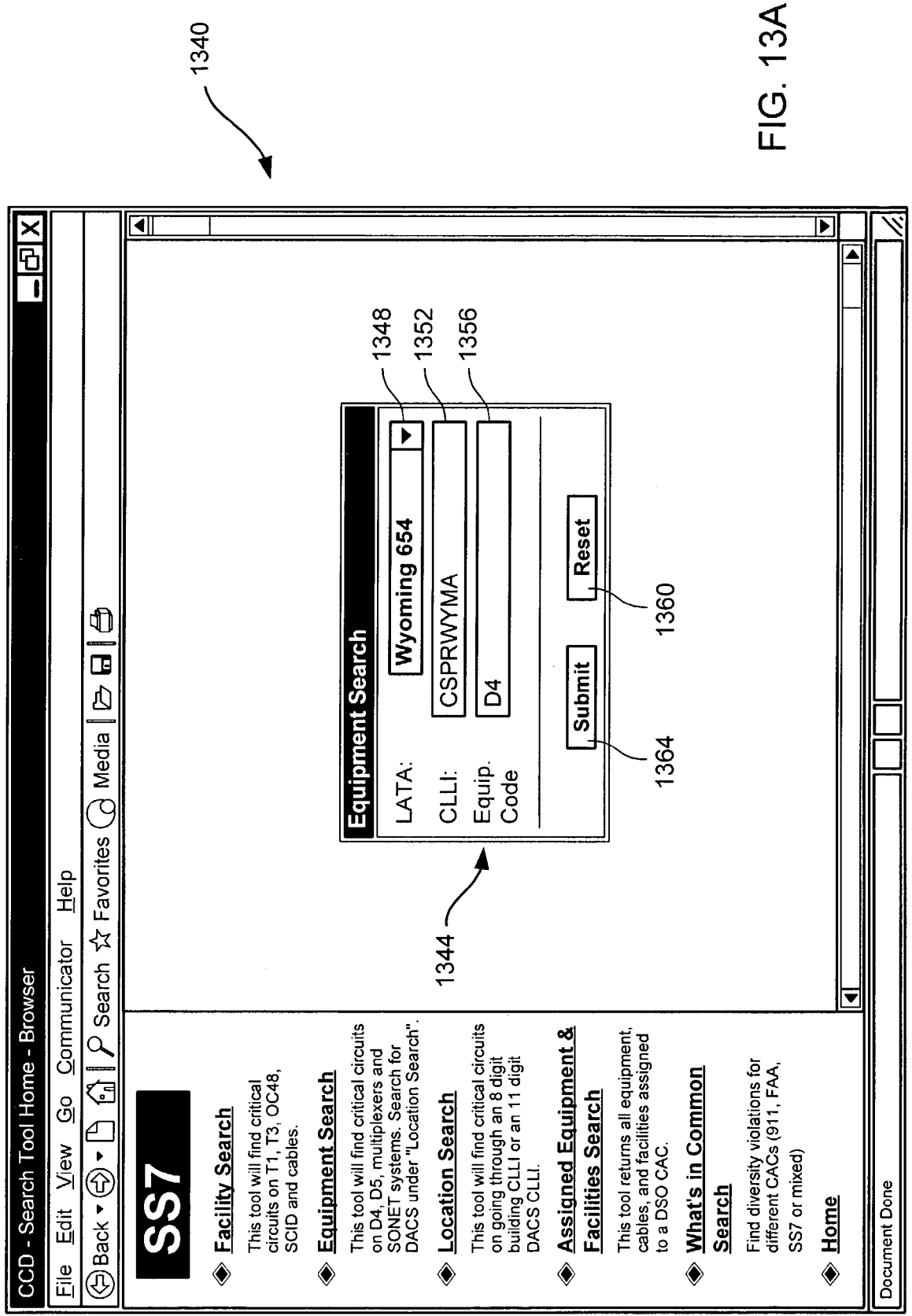

FIG. 15B

CCD - Search Tool Home - Browser

File  Edit  View  Go  Communicator  Help

Back ▸ | 🏠 | 🔍 Search ☆ Favorites 🎬 Media | ...

SS7

◆ Facility Search
This tool will find critical circuits on T1, T3, OC48, SCID and cables.

◆ Equipment Search
This tool will find critical circuits on D4, D5, multiplexers and SONET systems. Search for DACS under "Location Search".

◆ Location Search 1532
This tool will find critical circuits on going through an 8 digit building CLLI or an 11 digit DACS CLLI.

◆ Assigned Equipment & Facilities Search
This tool returns all equipment, cables, and facilities assigned to a DSO CAC.

◆ What's in Common Search
Find diversity violations for different CACs (911, FAA, SS7 or mixed)

◆ Home

---

Assigned Equipment and Facilities Search

LATA: Wyoming 654 ▸

CAC: MPJ3KF3

[Submit]   [Reset]

Search Results: MPJ3KF3

| CAC | Customer | CLO | Circuit ID |
|---|---|---|---|
| MPJ3KF3 | AE090040 | WYM015455001 | 000/DF24SLA/CHYNWYMA00W/77/CSP... |
| | LOCATION CHGWYO1 EQUIP CODE SNMSUY01RA RELAY RACK 01102.3A | | |
| | LOCATION CHYNWYMA EQUIP CODE D4CBRGJHRA RELAY RACK 01109.30 | | |
| | LOCATION CHYNWYMA EQUIP CODE M3MMCLS1RA RELAY RACK 01107A.29 | | |
| | LOCATION CHYNWYMA EQUIP CODE M3MMCSR1RA RELAY RACK 01107A.29 | | |
| | LOCATION CHYNWYMA EQUIP CODE SNMSTAC1RA RELAY RACK 010107.37A | | |
| | LOCATION CHYNWYMA EQUIP CODE SNMSUY01RA RELAY RACK 010107.37A | | |
| | LOCATION CSPRWYMA EQUIP CODE D4CB53HBRA RELAY RACK 02255.07 | | |
| | LOCATION CSPRWYMA EQUIP CODE M3MMCLS1RA RELAY RACK 02223.02 | | |
| | LOCATION CSPRWYMA EQUIP CODE M3MMCSR1RA RELAY RACK 02223.02 | | |
| | LOCATION CSPRWYMA EQUIP CODE SNMSTAC1RA RELAY RACK 02223.02 | | |
| | LOCATION CSPRWYMA EQUIP CODE SNMSUY01RA RELAY RACK 02223.02 | | |
| | LOCATION DGLSWYMA EQUIP CODE SNMSUY01RA RELAY RACK 01110.09A | | |
| | LOCATION GLNDWYMA EQUIP CODE SNMSUY01RA RELAY RACK 01100.1A | | |
| | LOCATION GLRKWYMA EQUIP CODE SNMSUY01RA RELAY RACK 01101.A | | |
| | LOCATION WHLDWYMA EQUIP CODE SNMSUY01RA RELAY RACK 01111.3A | | |
| | TERMA CHYNWYMA TERMZ CSPRWYMA FACDES 0105 FACTYP T3 DV CNT 00004 | | |

Document Done

SYSTEMS AND METHODS FOR DETERMINING CRITICAL CIRCUIT DIVERSITY

CROSS-REFERENCES TO RELATED APPLICATIONS

This application is related to commonly-assigned U.S. patent application Ser. No. 10/328,421 entitled "SYSTEMS AND METHODS FOR ANALYZING CRITICAL CIRCUITS," filed on the same date as this application by Dieter Zerressen, the entire disclosure of which is incorporated herein by reference.

BACKGROUND OF THE INVENTION

In the telecommunication industry, certain circuits are considered critical, generally because any interruption of the service provided by the circuit would be unacceptable. For instance, circuits used to transport traffic relating to emergency 911 calls and circuits used by the Federal Aviation Administration's air traffic control system often are designated as critical because their failure could lead to catastrophic consequences. Other circuits, including some circuits in a typical Signaling System 7 ("SS7") network, can be considered critical because a service interruption of such a circuit would negatively impact the provision of telecommunication services to a particular geographical area. On the other hand, many circuits are not considered critical, in that the failure of a single such circuit would have only minimal impact on the provision of telecommunication services.

Circuit failures can result from many sources, including cable cuts, equipment failure, or even power loss or natural disaster at a critical location. In order to guard against the catastrophic failure of a critical circuit, telecommunications providers often build redundancy into their telecommunication networks. For instance, FIG. 1A illustrates a portion of a simple telecommunication network 100. In example network 100, service switching point ("SSP") 104 is located in Grand Junction, Colo. In order to have telecommunication access to the rest of the world, Grand Junction's SSP is connected by SS7 "A Link" 108 to Signal Transfer Point ("STP") 112 in Denver, which provides a connection between SSP 104 and the rest of the telecommunication network. In this example, A Link 108 is a critical circuit because, if it suffered a service interruption, Grand Junction would have no connectivity to STP 112. To remedy this problem, a telecommunication provider typically would provide an additional A Link 116 between SSP 104 and a second STP 120. In this way, if A Link 108 were cut, connectivity would be maintained by A Link 116.

This redundancy fails, however, if both A Links 108, 116 use the same telecommunication facilities or equipment. For instance, if A Links 108, 116 occupy channels on the same T1 line for at least part of the distance from Grand Junction to Denver, a single cut to that T1 line would sever both A Links 108, 116, such that connectivity between Grand Junction and Denver would be lost. Thus, in order to obtain the full benefits of redundancy, the critical circuits must exhibit complete diversity of facilities, cable and equipment.

In reality, however, diversity violations are commonplace in telecommunication networks because of the nature of such networks. Most telecommunication providers use a provisioning system, for example the Trunks Integrated Records Keeping System ("TIRKS®") from Telcordia Technologies, Inc., to provision and track circuits in their telecommunication networks. Unfortunately, such systems often provision circuits according to the most efficient path between two switches, such that multiple circuits between two switches usually will be carried on the same facilities, and often on the same equipment, without regard to diversity considerations. Moreover, even if two circuits are diverse as originally provisioned, those skilled in the art can appreciate that normal network churn often will result in the automatic re-provisioning of those circuits, which often destroys any diversity originally built into the circuit design. Compounding the problem, provisioning systems generally offer no means of determining whether two circuits are diverse (or even of tracking whether they should be diverse).

What is needed, therefore, is a tool for analyzing the diversity of critical circuits. Ideally, such a tool should allow a user to identify two or more critical circuits that require diversity, analyze the facilities and equipment utilized by each identified circuit, and display for the user a list of any common facilities or equipment, so that the user can determine the location and nature of any diversity violation.

BRIEF SUMMARY OF THE INVENTION

According to the invention, therefore, systems and methods are provided for analyzing the diversity of a set of critical telecommunication circuits. For example, according to some embodiments of the invention, a method is provided for analyzing the diversity of critical telecommunication circuits. The method can include determining a critical circuit set, wherein the critical circuit set comprises a first critical circuit and a second critical circuit. The method also can include identifying a first set of telecommunication resources associated with the first critical circuit, identifying a second set of telecommunication resources associated with the second critical circuit, and comparing the first set of telecommunication resources with the second set of telecommunication resources to determine whether the critical circuit set is diverse. In one aspect, the circuit set can be determined to be diverse if the first and second sets of telecommunication resources do not share any common resources; conversely, the circuit set can be determined not to be diverse if the two sets of resources do share any common resources.

In certain embodiments, identifying a set of telecommunication resources associated with a critical circuit can comprise accessing a database, searching the database for a record comprising a set of information about the critical circuit, and using the set of information to identify a set of associated telecommunication resources. According to other embodiments, information about the first and second critical circuits can be stored in a second database. In accordance with still other embodiments, if the first and second sets of telecommunication resources do not share any common elements, the critical circuit set is determined to be diverse, but if the first and second sets of telecommunication resources do share any common elements, the critical circuit set is determined not to be diverse. In a particular aspect, such telecommunication resources can be selected from a group consisting of telecommunication facilities, telecommunication equipment and geographic locations.

In accordance with a particular embodiment of the invention, the method can be periodically repeated, and statistical data about the diversity of the critical circuit set optionally can be tracked. In addition, some embodiments can provide a report detailing whether the critical circuit set is diverse, wherein if the critical circuit set is determined not to be diverse, the report can identify each shared telecommunication resource. If the critical circuit set is determined not to be diverse, an action can be performed to remedy the diversity violation. The action can include sending an electronic message to a technician, electronically re-provisioning at least one of the circuits in the critical circuit set, electronically updating a provisioning database, and suggesting alternative telecommunication resources for at least one of the critical circuits.

In one particular embodiment of the invention, a method is provided for analyzing the diversity of multi-leg critical telecommunication circuits, the method comprising determining a first critical circuit comprising a first leg and a second leg and determining a second critical circuit comprising a first leg and a second leg. The method further comprises identifying a first set of telecommunication resources associated with the first leg of the first critical circuit, a second set of telecommunication resources associated with the first leg of the second critical circuit, a third set of telecommunication resources associated with the second leg of the first critical circuit, and a fourth set of telecommunication resources associated with the second leg of the second critical circuit.

According to this embodiment, the first and second sets of telecommunication resources can be compared to determine whether the first legs of the first and second critical circuits share any telecommunication resources, and the third and fourth sets of telecommunication resources can be compared to determine whether the second legs of the first and second critical circuits share any telecommunication resources. If the first legs of the first and second circuits share a common resource or the second legs of the first and second circuits share a common resource, the circuits can be considered non-diverse.

In a different embodiment of the invention, another method of analyzing the diversity of critical telecommunication circuits is provided. According to this embodiment, the method includes determining a critical circuit set comprising at least two critical circuits and inputting identification information about each of the two critical circuits into a computer. The computer can comprise a computer readable medium including instructions executable by the computer to perform a process. According to this embodiment, the process includes identifying each of the two critical circuits, searching a first database for each of the two critical circuits, obtaining information about each of the two critical circuits from the first database, wherein the information includes the identity of each telecommunication resource associated with each of the plurality of critical circuits, storing the information about each of the two critical circuits in a second database, and comparing the obtained information for each of the two critical circuits.

In accordance with this embodiment, if the two critical circuits are associated with any common telecommunication resources, the circuit set is determined to be non-diverse, but if the two critical circuits are not associated with any common telecommunication resources, the circuit set is determined to be diverse. The process performed by the computer can further include producing a report detailing whether the circuit set is diverse, wherein if the circuit set is not diverse, the report identifies each common resource associated with both of the critical circuits. In other embodiments, the critical circuit set can comprise more than two critical circuits, and the method can further comprise determining whether the circuit set is diverse based on the compared resources. In some such embodiments, the circuit set can be identified as diverse if none of the circuits in the circuit set share any common resources with any other circuit in the circuit set. Alternatively, the circuit set can be identified as diverse if any two circuits in the circuit set share no common resources.

Still other embodiments of the invention provide systems for performing these and other methods. One such system can comprise a first database comprising information about the plurality of telecommunication circuits, and a computer in communication with the first database. The computer can have instructions executable to analyze the diversity of the set of critical circuits. According to certain embodiments, the system can further comprise a second database in communication with the computer and capable of storing information about the set of critical circuits.

BRIEF DESCRIPTION OF THE DRAWINGS

FIG. 4 illustrates an example flat file that can be used to input identified circuits, according to certain embodiments of the invention.

FIG. 7 illustrates an example electronic mail message that can be used to notify a user when an input file has finished processing, according to certain embodiments of the invention.

FIGS. 8A and 8B illustrate example screen displays that can be used to provide circuit diversity status reports, according to certain embodiments of the invention.

FIGS. 12A through 12F illustrate example screen displays that can be used to search for particular telecommunication facilities, according to certain embodiments of the invention.

FIGS. 13A and 13B illustrate example screen displays that can be used to search for particular telecommunication equipment, according to certain embodiments of the invention.

FIGS. 15A and 15B illustrate example screen displays that can be used to search for telecommunication resources associated with a particular circuit, according to certain embodiments of the invention.

DETAILED DESCRIPTION OF THE INVENTION

Figure 1A:
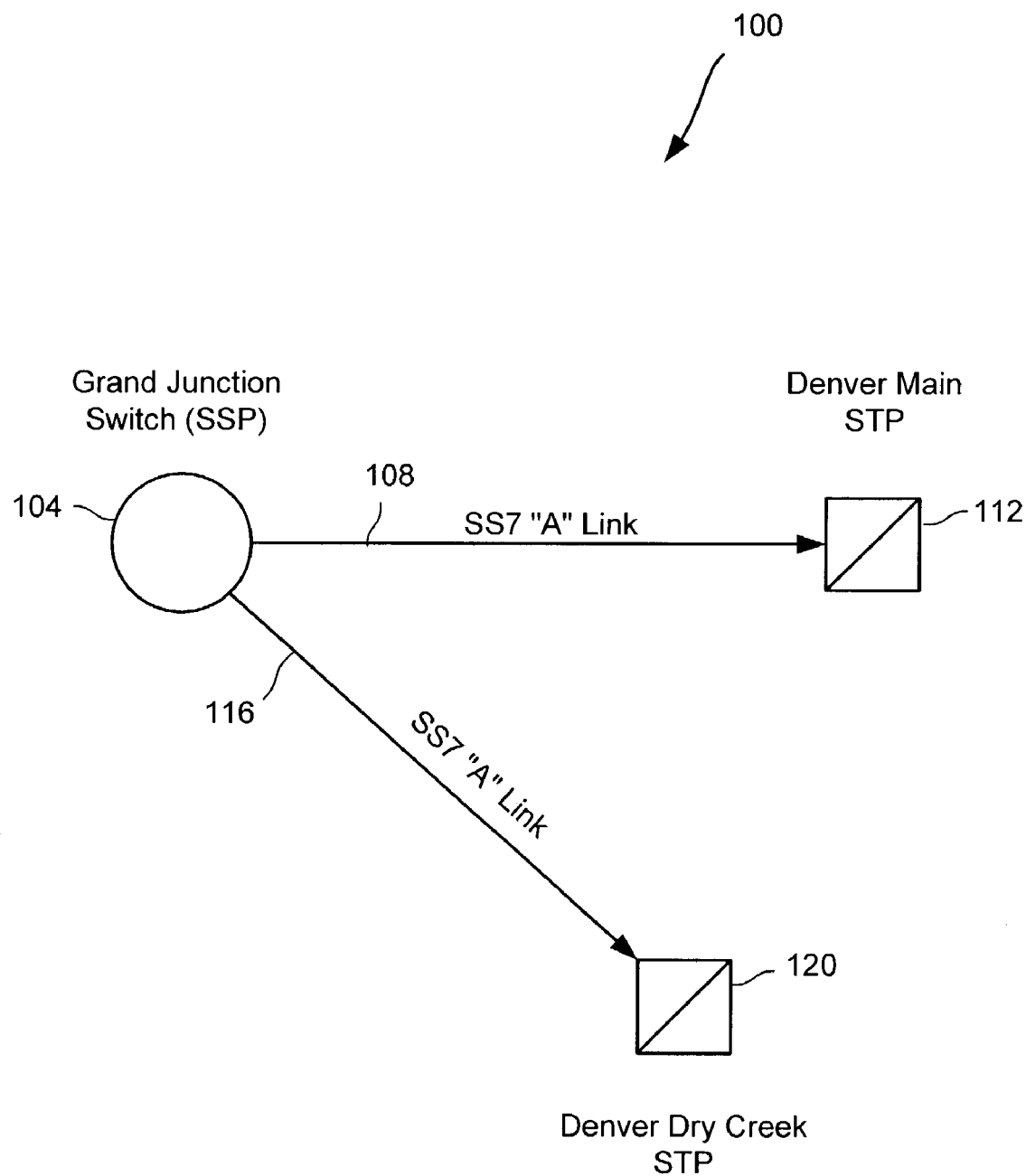
FIGS. 1A and 1B are circuit diagrams illustrating point-to-point telecommunication circuits.

The present invention relates to methods and systems of analyzing the equipment and facilities used by a given telecommunication circuit or set of circuits, including determining whether such circuit sets are diverse. Embodiments of the invention can provide many novel and useful benefits, including allowing a telecommunication provider to analyze the diversity of its critical circuit inventory and track individual and overall diversity statistics to understand the level of risk presented by non-diverse, critical circuits. In certain embodiments, these systems and methods can be used to analyze the diversity of a circuit set comprising two or more circuits. In other embodiments, the systems and methods can be used to determine the association between one or more critical circuits and particular transmission facilities, equipment and/or physical locations, or to search for particular circuits and/or telecommunication resources, for instance, to determine the circuits affected by a service outage.

As described herein, the term "diversity" has a broad meaning. For example, any two circuits in a circuit set can be considered diverse if they share no common equipment or facilities. For purposes of this document, resources that are "shared" or "common" are those that are used by more than one critical circuit, and such resources can be the cause of a diversity violation if, for instance, they are shared by two or more circuits in a single circuit set. The term "circuit set" thus means any group of two or more circuits that are to be compared for diversity. Merely by way of example, a circuit set can comprise two or more circuits that perform the same critical function (i.e., are redundant), such that if either circuit remains operative, the critical function can be performed. It should be noted, however, that the grouping of circuits into a given circuit set is discretionary.

The term "equipment" means any telecommunication device used to carry, switch, process or otherwise enable or facilitate the transmission of signals along a given circuit and includes such devices as cross-connects (including digital access and cross-connect systems ("DACS")), multiplexers, channel banks (including D4 and D5 channel banks) telecommunication racks, and other devices known to those skilled in the art. The term "facility" refers to any cable or medium known in the art over which voice or data signals can travel, including fiber optic lines, copper wires, radio transmissions, and any other telecommunication lines, regardless of protocol or bandwidth, including, for example, DS0, DS1, and DS3 lines, and Synchronous Optical NETwork ("SONET") channels. In addition to equipment and facilities, the physical locations of the circuits sometimes are considered in determining diversity, such that if any of the respective equipment or facilities employed by the two circuits reside in the same physical location (e.g., the same local office, switch, or the like), the circuits can be considered not diverse. Equipment and facilities (and optionally, physical locations) are referred to collectively herein as "telecommunication resources" and together can comprise the universe of hardware necessary to provide telecommunication services.

For circuit sets comprising more than two circuits, the term diversity can be more amorphous. For instance, if three or more selected circuits are analyzed as a set, they can be considered diverse if no two of the selected circuits share any common telecommunication resources. On the other hand, different diversity criteria may be applied to such sets as well. Merely by way of example, a group of three circuits could be considered diverse if any two of the three circuits were diverse, as defined above, such that a any single point of failure might disable two of the circuits but would leave the third functional. Those skilled in the art will readily appreciate that other diversity criteria can apply as well. For instance, a group of eight circuits might be defined as diverse only if four of the circuits were completely diverse from the other four circuits.

Figure 1B:
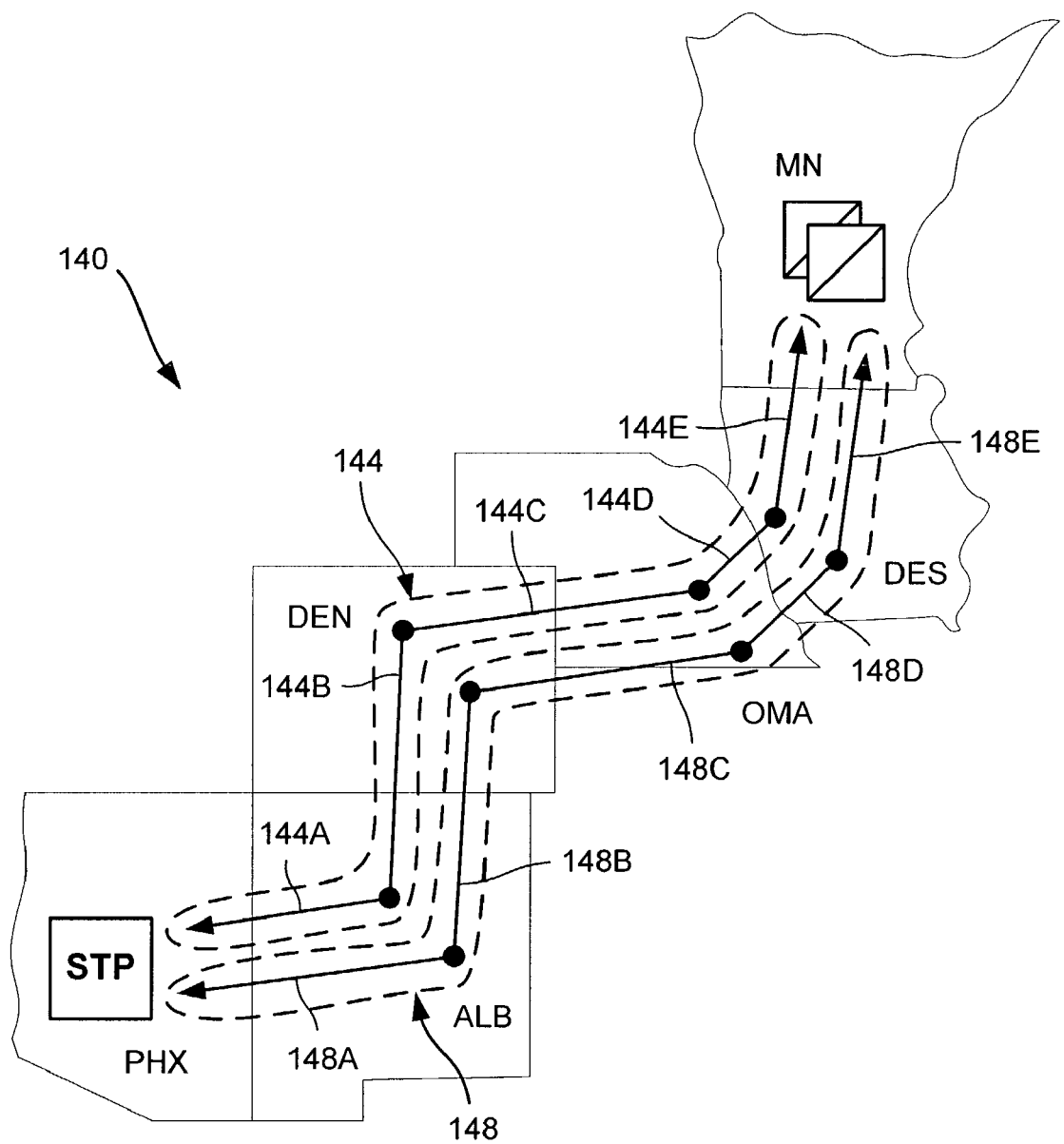

In certain circumstances, a circuit will comprise one or more sub-circuits ("legs"), and a diversity analysis of two circuits can involve a comparison of the respective legs of each. For example, FIG. 1B illustrates a portion of a telecommunication network 140, including two circuits 144, 148 between Phoenix and Minneapolis. Circuit 144 comprises leg 144A between Phoenix and Albuquerque, leg 144B from Albuquerque to Denver, leg 144C from Denver to Omaha, leg 144D from Omaha to Des Moines and leg 144E between Des Moines and Minneapolis. Likewise, circuit 148 comprises legs 148A, 148B, 148C, 148D and 148E, each running between the same city pair as its counterpart leg in circuit 144. Diversity between circuits 144 and 148 can be understood to mean that each corresponding leg of circuits 144 and 148 are diverse. To wit, if legs 144A and 148A are diverse, legs 144B and 148B are diverse, legs 144C and 148C are diverse, legs 144D and 148D are diverse, and legs 144E and 148E are diverse, circuits 144 and 148 can be considered diverse. It is important to note, however, that the diversity requirements for groups of circuits will vary according to the characteristics and use of the circuits in question, and that how diversity is defined in a particular implementation is discretionary. The present invention therefore does not depend on the definition of diversity between circuits but instead can accommodate any desired definition of diversity.

Figure 2:
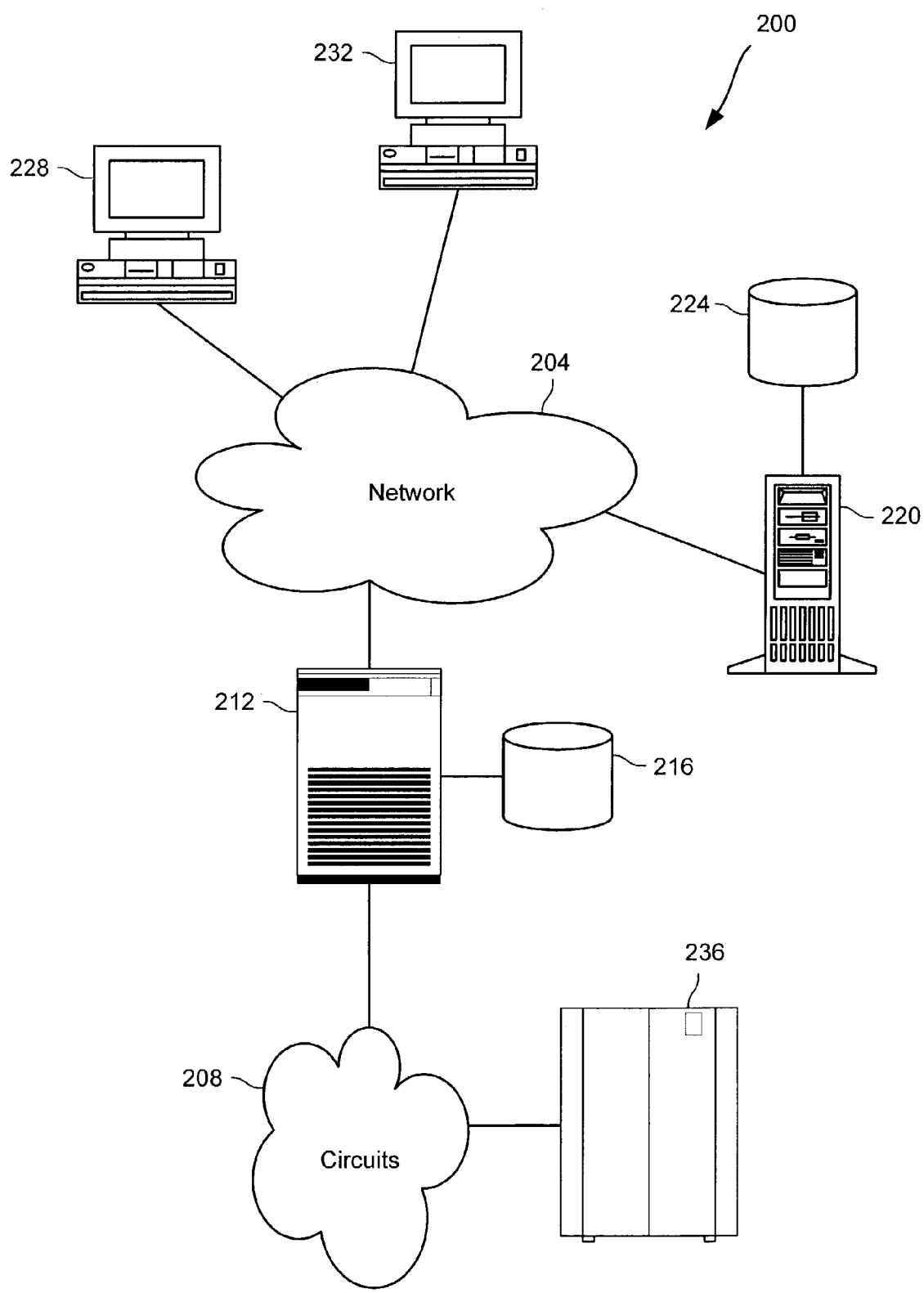
FIG. 2 illustrates a system that can be used to determine critical circuit diversity according to certain embodiments of the invention.

FIG. 2 illustrates a system 200 that can be used to analyze the diversity of a given set of circuits, according to certain embodiments of the invention. As shown in the illustrated embodiment, system 200 can operate in a network 204 environment. Network 204 may be any type of network that links various computers together, including, for example, the Internet, an intranet, a local area network, a wide area network, a wireless network, and the like. Network 204 can be in communication with a collection of telecommunication circuits (collectively referenced using numeral 208), perhaps through provisioning system 212, as illustrated on FIG. 2. Alternatively, network 204 could be coupled directly to circuits 208 through a router or other telecommunication device, as is known in the art, or network 204 could comprise circuits 208. Those skilled in the art will appreciate that many other network configurations are possible within the scope of the invention as well.

Provisioning system 212 can be any system that allows for the provisioning and/or identification of circuits 208. Generally, provisioning system 212 can be a computer of some type, with a processor (not shown), a memory device, such as a random-access memory ("RAM"), and perhaps one or more storage devices, such as disk drives, optical media, CDROM drives, and the like, all of which are well familiar to those skilled in the art, running a software package, for example the TIRKS® system described above. Merely by way of example, in some embodiments, provisioning system 212 is a mainframe computer, familiar to those skilled in the art.

In some embodiments, provisioning database 216 is in communication with provisioning system 212 and can store the information created and/or used by provisioning system 212. In particular, provisioning database 216 can store information about circuits 208, including, for instance, the origination and termination points of each circuit, as well as all telecommunication resources used by the circuit, including, the physical locations of the such resources. In certain embodiments, provisioning database 216 can include additional information about circuits 208, as well as additional information about the telecommunication resources used by circuits 208. Such information can include the type, nature and location of such resources, as well as, for example, the manufacturer of each resource and any incompatibilities among different resources. In some embodiments, provisioning database 216 can be stored on a storage device within provisioning system 212, perhaps a disk drive. In other embodiments, provisioning system 212 is in communications with provisioning database 216, either directly or perhaps through network 204 or even circuits 208. Hence, the location of provisioning database 216 is discretionary.

Also in communication with network 204 can be server computer 220, which can include critical circuit database 224. (As noted with respect to provisioning database 216, critical circuit database 224 can reside on a storage device local to server 220 or can be remote from server 220, so long as server 220 can communicate with critical circuit database 224.) Server 220 can be one of many types of servers known to those skilled in the art, including for instance, a mainframe, minicomputer or UNIX™ server. Additionally, server 220 can be a PC server running one of the many varieties of Windows™ operating systems. Server 220 generally includes a storage device, perhaps of one of the types described above, as well as a processor and a memory device, none of which are shown on FIG. 2, but all of which are familiar to those skilled in the art. In some embodiments, server 220 includes software enabling it to act as a server on the World Wide Web (the "Web") (e.g., accepting and responding to requests formatted using the Hypertext Transfer Protocol ("HTTP") and other Internet protocols). Server 220 also can be programmed to execute a critical circuit application, which in some embodiments can interface with provisioning database 216, either via provisioning system 212 or directly (perhaps through network 204), to perform searches and obtain information about identified circuits.

Those skilled in the art will recognize that there are many methods of performing these procedures. For instance, in some embodiments, provisioning database 216 runs commercial database software, such as that produced by Oracle Corp. of Redwood City, Calif., and the critical circuit application can perform standard SQL searches in provisioning database 216 to obtain the desired information. In other embodiments, provisioning database 216 can be created using a proprietary format, and the critical circuit application can implement specialized searching protocols. Thus, the present invention can accommodate virtually any sort of provisioning database 216 that can be searched through any of the various methods of database searching known to those skilled in the art. It is necessary only that provisioning database 216 provide a way for information about circuits 208 to be programmatically accessed by the critical circuit application.

Critical circuit database 224, which like provisioning database 216 can run commercial database software or can be written using a proprietary database engine, can store information about circuits identified as critical. Critical circuit database 224 also can maintain information about the telecommunication network, for instance, the identities and descriptions of equipment and facilities used by the critical circuits, as well, perhaps, as the physical location of such equipment and facilities. In certain embodiments, critical circuit database 224 maintains an association between each circuit and the equipment, facilities, and/or physical locations over which that circuit travels. In other embodiments, critical circuit database 224 organizes the stored information so that it can be searched by circuit, equipment, facility or location, as well as by categories of each of these. For instance, critical circuit database 224 could be searched either to find all circuits meeting a certain criteria or to find all facilities or equipment meeting certain criteria. In particular embodiments, critical circuit database 224 can include all available information about each critical circuit, and each associated telecommunication resource, in the telecommunication provider's inventory. In such embodiments, critical circuit database can be thought of as a subset of provisioning database 216; whereas provisioning database 216 can contain information about the entire circuit inventory, critical circuit database can contain similar information about all critical circuits.

Also in communication with network 204 are additional computers 228, 232, which can communicate with server 220 to access the critical circuit application. It will be appreciated, however, that any number of computers may be coupled to network 204. In fact, in certain embodiments, where network 204 is in communication with the Internet, and server 220 acts as a Web server, any computer connected to the Internet potentially could communicate with server 220 to access and/or operate the critical circuit application (subject to security considerations familiar to those skilled in the art).

Further, each of computers 228, 232 may be any type of input and/or processing device that is capable of communicating with a network. Merely by way of example, such computers may comprise workstations, desktop personal computers, laptop computers, mobile phones with microbrowsers, personal digital assistants, and the like. As shown, computers 228, 232 each can have a display screen for displaying various information and may include an operating system (for instance, Microsoft™ Windows™ or any of the variety of UNIX™-based operating systems) and have a Web browser (for instance, Microsoft™ Internet Explorer™ or Netscape™ Navigator™) to view documents formatted with the Hypertext Markup Language ("HTML"). These computers may also include various input devices, such as a keyboard and/or mouse, as is known in the art. Other components that may be used include disk drives, memory devices and the like, as is known in the art.

In this manner, computers 228, 232 may be used over network 204 to access and execute the critical circuit application. In some embodiments, server 220 is configured to allow users to access and control the critical circuit application with a web browser running on a computer (e.g., 228). In other embodiments, the critical circuit application can be a client-server program comprising proprietary client software on computer 228 in communication with proprietary server software on server 220. In still other embodiments, the critical circuit application can be run locally on server 220; in such embodiments, server 220 can even be a computer similar to computers 228, 232, so long as it can run the critical circuit application and can communicate with provisioning database 216.

In the illustrated embodiment, server 220 is capable of executing the critical circuit application in response to requests from computers 228, 232. Thus, system 200 is capable of performing any of the methods described herein. For instance, if a user would like to analyze the diversity of two circuits identified as critical, the user may access the critical circuit application by using a web browser running on computer 228 to input a request to server 220. (For ease of description, the terms "analyze" and "analysis" are used herein to describe any operation in which information is obtained about a particular circuit or group of circuits and, optionally, where information relating to any two or more circuits is compared, for example, to determine whether the circuits are diverse.)

In this example, the request can identify a circuit set, comprising two circuits, to be analyzed. In response to the request, the critical circuit application can access provisioning database 216, in the manner described above, and obtain information about each of the identified circuits. In certain embodiments, the critical circuit application can store the pertinent information in critical circuit database 224. The critical circuit application then can compare the information obtained for each circuit to determine whether the circuits share any common telecommunication resources. If so, a report can be generated for the user, describing the diversity violations.

In some embodiments, certain actions may be taken if a diversity violation is found. For instance, computer 232 may be accessible by a service technician, and if a diversity violation occurs, a message automatically can be sent by the critical circuit application to an electronic mailbox on computer 232, notifying the service technician that a diversity violation has occurred and that physical action is required to remedy the violation. For instance, if a diversity violation occurs because two circuits in a set share the same cross-connect, the service technician can be instructed to route one of the circuits through a different cross-connect. In other embodiments, the necessary changes can be implemented electronically, and physical intervention thus is not required. Merely by way of example, if two critical circuits occupy channels on the same DS1 line, the critical circuit application can, perhaps via message to switch 236, electronically move one of the circuits to a different transmission medium (for example, a different DS1 line). Those skilled in the art will recognize that many other circumstances exist in which automatic correction (either through notification to a service technician or through direct access to the relevant telecommunication resource) can correct a diversity violation.

In other circumstances, however, automatic correction may be either impossible or inappropriate (e.g., if such a change would require an outage or would entail significant cost). For this reason, certain embodiments of the invention allow for diversity reports to be returned directly to the user requesting the diversity analysis (or to another person), so that the user can assess the diversity report and decide the appropriate action. As described in detail below, such reports could be sent to the user via any of a variety of other electronic communications known in the art, such as electronic mail message, pager message, HTML document or the like. In this and other ways, system 200 can be used to analyze the diversity of two or more circuits in a telecommunication network.

Figure 3:
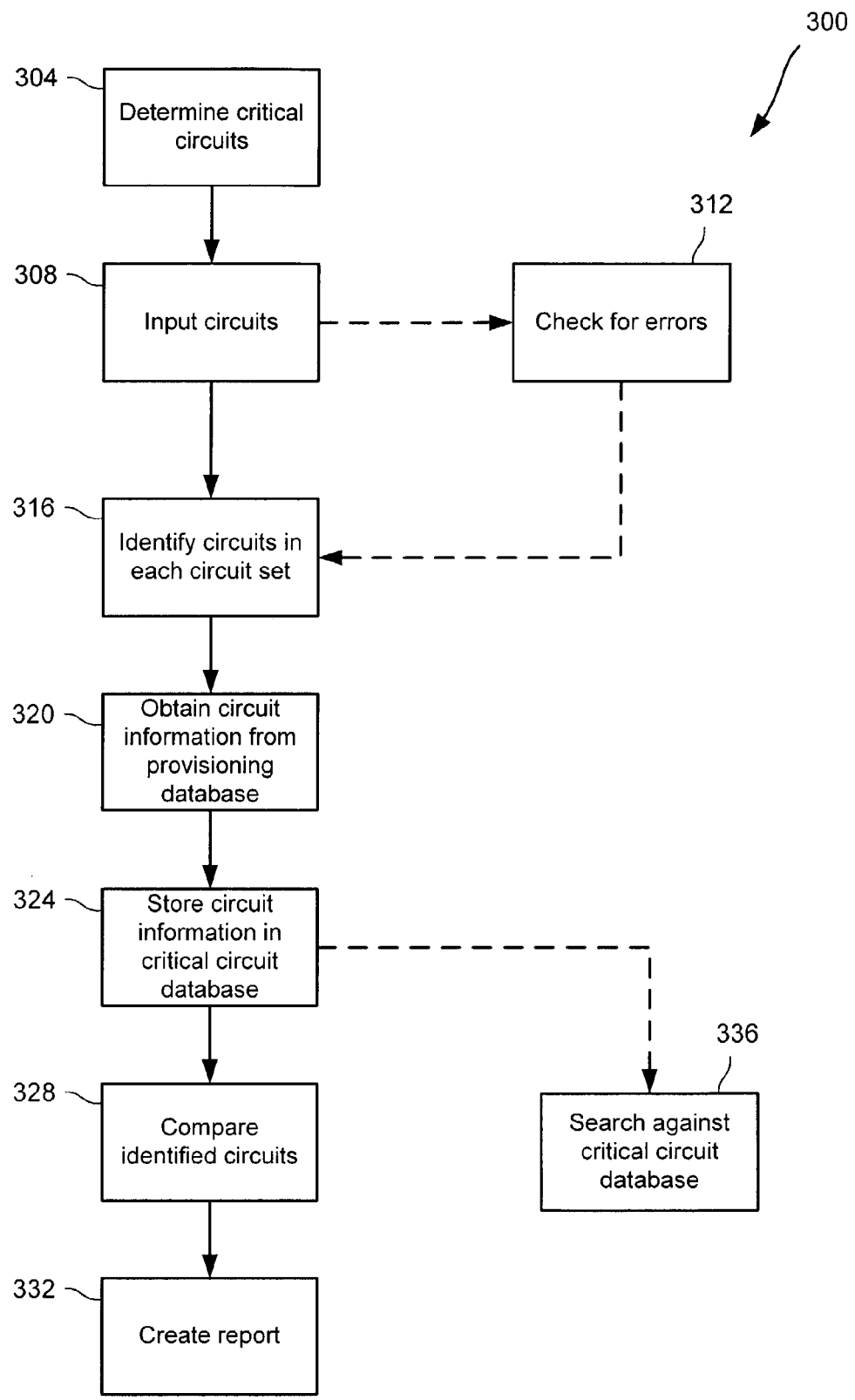
FIG. 3 is a process flow diagram that illustrates one method for determining critical circuit diversity, according to certain embodiments of the invention.

Turning now to FIG. 3, a method 300 is presented for analyzing circuit diversity according to certain embodiments of the invention. For ease of description, method 300 is described by reference to system 200 illustrated in FIG. 2 and described above, although it will be appreciated that method 300 is system-independent and may be implemented in any fashion without varying from the scope of the invention.

At block 304, the critical circuits are determined (e.g., identified or defined as critical). As described above, a circuit can be considered critical for any number of reasons. Furthermore, although described as "critical" herein for ease of reference, a circuit need not actually be considered critical in order to be analyzed according to the illustrated embodiment; the invention just as easily can accommodate any non-critical circuit, so long as the circuit is inventoried in provisioning database 216. Additionally, those skilled in the art will recognize that the determination or identification of critical circuits is discretionary, and the inclusion of that procedure in the illustrated embodiment is for purposes of description and should not be considered to limit the scope of the invention as claimed.

Depending on the embodiment, there may be as few as one critical circuit determined (for instance, when searching for the facilities, equipment and/or locations used by a particular circuit, as opposed to analyzing a circuit set for diversity, or when merely adding an additional circuit to critical circuit database 224 for possible future analysis). In other embodiments, a circuit set comprising multiple circuits may be analyzed for diversity. In fact, in certain aspects of the invention, a virtually unlimited number of circuits may be compared for diversity, constrained only by logistic considerations, such as the memory and processing power of server 220. Those skilled in the art will recognize, however, that practically speaking, circuit sets of more than eight or ten circuits are uncommon, and most frequently a circuit set will comprise only two or three circuits. Nonetheless, it is important to note that the invention is not limited to embodiments configured to analyze any given number of circuits.

After the critical circuits have been identified, they can be input to the critical circuit application, as illustrated by block 308. There are many methods of data input known to those skilled in the art. For instance, in a particular embodiment, the identities of the critical circuits are submitted on an HTML form via Web browser, and the critical circuit application running on server 220 accepts and interprets the data on the submitted form. Alternatively, the user can be given a list of pre-identified circuits from which to choose.

In other embodiments, it may be more efficient to submit the input in data files. This method of submission is advantageous when a large number of circuit sets need to be analyzed. Those skilled in the art will appreciate that there are many additional benefits to providing the input in data files; for instance, the critical circuit application can store the files, perhaps in critical circuit database 224 or on a storage device attached to server 220, as described above, perhaps for processing at a later time, or for processing on a periodic basis, for instance to ensure that the identified circuit sets remain diverse (and, optionally, to provide a warning in case a diversity violation occurs later). Of course, even in embodiments where no input file is used (for instance, where the user submits the input on an HTML form), the critical circuit application can save the submitted input to a file for storage and/or later processing as described above.

In certain embodiments, the input file may be formatted according to certain conventions. The formatting of the input file is, of course, discretionary, so long as the input file provides sufficient information to allow the critical circuit application to identify and search for the circuits of interest in provisioning database 216. For purposes of illustration, however, FIG. 4 illustrates an example input file 400 that may be used to submit requests for circuit analysis according to certain embodiments of the invention. In this example file, each line (e.g., 404, 408) represents a separate circuit set, and each line (e.g., 404) can comprise several fields 412,

416, 420, 424, 428, 432, 436, 440, 444. (Those skilled in the art will recognize that many of the fields should be considered optional and thus are described herein to illustrate enhanced features that are utilized by various embodiments of the invention.) For instance, on line 404, field 412 indicates the type of circuits to be analyzed, in this case SS7 circuits. As discussed above, a variety of different circuit classifications could be employed, as needed by the user. In particular embodiments, the output from the circuit analysis can be classified by circuit type, for instance, grouping all output files for emergency (911) circuits in a particular directory on server 220. Nonetheless, certain embodiments may omit field 412.

Each line (e.g., 404) in input file 400 can also contain a field indicating the number of circuits in that circuit set. For instance, in the illustrated embodiment, field 416 on line 404 indicates that there are two circuits in the circuit set represented by line 404. According to certain embodiments, field 416 instructs the critical circuit application to look for the number of circuit identifiers specified in that field. Those skilled in the art will recognize, however, that the critical circuit application also could determine the number of circuits in a particular set through other means; for instance, the critical circuit application could be configured to identify each field meeting certain criteria (e.g., containing seven characters, the first three of which are letters) as a circuit identifier and could determine the composition of a set through identification of all such fields.

In the illustrated embodiment, each line of example file 400 also contains one or more reserved fields (e.g., 420) that may be used to provide further functionality in different implementations of the invention. For example, in some embodiments, the value "N" in field 420 may indicate that, although the information for each circuit in the relevant set should be obtained from provisioning database 216 and analyzed for diversity, none of this data should be saved in critical circuit database 224. Alternatively, another value (e.g., "A") could indicated that the circuit information should be added to critical circuit database 224 but that no diversity analysis should be performed on that circuit set, a feature that can be used, for example, to populate critical circuit database 224 with relevant information without performing any analysis.

Other functions that might be accommodated by field 420 include implementing particular diversity rules. As mentioned above, circuit diversity can be defined in many different ways, and in certain embodiments, field 420 can include instructions on how to analyze diversity, for instance, by requiring that none of the circuits in the circuit set have any common telecommunication resources or, alternatively, by requiring that at least one of the circuits in the set have telecommunication resources unique from the rest of the set. Still other features that can utilize reserved field 420 include instructions for configuring the critical circuit application to process a particular circuit set in a certain way. For instance, a certain value (perhaps the letter "C") in field 420 can instruct the critical circuit application to compare that circuit set to an archived circuit set (for instance, the identical circuit set in a stored input file) and only analyze those circuits that have changed since a prior analysis. In this way, for example, the critical circuit application can quickly illustrate for a user which circuits have been re-provisioned, as well as whether those circuits create any new diversity violations.

In accordance with certain embodiments, file 400 can include a field 424 facilitating the use of multiple provisioning databases. For instance, a telecommunication provider might have different provisioning systems 212 in different regions, each with its own provisioning database 216. In such a case, field 424 can indicate which provisioning database to access when obtaining information about a given circuit set. For instance, if a telecommunication provider uses three provisioning databases, they could be identified by generic terms (e.g., A, B, C, respectively) or by more descriptive identifiers (e.g., "WEST," "CENTRAL," and "EAST," respectively). Hence, those skilled in the art will appreciate that while field 424 is depicted as a one-character field the example file 400, it (as well as the other fields 412, 416, 420, 428, 432, 436, 440, 444 depicted on FIG. 4) may be of varying length, depending on the embodiment.

In some embodiments, the critical circuit application can be configured to search all provisioning databases for information about the circuits in a given circuit set, such that field 424 may be omitted or ignored by critical circuit application. Although efficiency considerations might militate against this approach as a general matter, it can be beneficial in some embodiments, for instance, where a single circuit set might contain circuits inventoried in multiple provisioning databases.

Input file 400 also can include the Local Access Transport Area ("LATA") code for each circuit, as illustrated by field 428. For example, those skilled in the art will appreciate that in some embodiments, the LATA code may be necessary to uniquely identify a circuit to be analyzed, depending on the way circuit information is stored in provisioning database 216. In other embodiments, a circuit may be identified without reference to the LATA code of the circuit, and field 428 can be optional in such embodiments. Notably, however, inclusion of the LATA code in file 400 can serve useful functions other than as a search key in provisioning database 216. For example, it can provide a quick reference for the user or a later reader of a diversity report (described below), indicating the general location of the circuit. Additionally, it can be used by the critical circuit application, for example in allowing diversity reports to be grouped for analysis and/or saved according to LATA, so circuit diversity easily can be analyzed on a LATA-by-LATA basis.

In the illustrated embodiment, line 404 also includes fields 432, 436 identifying the circuits to be analyzed. According to the illustrated embodiment, circuit identifiers 432, 436 can be character strings randomly assigned by provisioning system 212. One example of such identifiers are circuit administration codes ("CAC" codes) known to those skilled in the art. In other embodiments, however, the circuits could be identified through other means, perhaps using a code related to the origination and termination points of the circuit, and the circuit identifiers could be of different lengths or could comprise different characters. Those skilled in the art will recognize that there are many possible methods of identifying circuits, any of which may be accommodated by the present invention, so long as each circuit is associated with a unique identifier.

Notably, in line 404, there are two circuit identification fields 432, 436, which correspond to the number of circuits specified in field 416. Thus, in the illustrated embodiment, the number of circuit identification fields can correspond to the number of circuits in the circuit set to be analyzed.

Finally, line 404 can include a comment field 440. The contents of comment field 440 are discretionary, and in some embodiments, comment field 440 can be ignored by the critical circuit application or merely be added to any diversity reports, as discussed below. In some embodiments, comment field 440 can include information that assists users in identifying the circuits set specified by line 404. For instance, in the illustrated embodiment, comment field 440 includes the Common Language Location Identifier ("CLLI") code relating to the circuits in the relevant circuit set. Those skilled in the art are well familiar with the use of CLLI codes to identify circuits by location. In addition, comment field 440 can include a description in English (or any other language) assisting in the identification of the circuit, for instance, the name of the city, Cheyenne, where the circuits in the set are located. As described below, comments field 440 also can be useful in labeling diversity reports.

Comment field 440 can be delimited in a variety of ways known to those skilled in the art. For instance, in the illustrated embodiment, the critical circuit application, upon reading field 416, can look for two circuit identification fields (432, 426) and will treat any text after those fields as comment text. In other embodiments, comment text could be delimited in many other ways, for instance, by a particular character, such as a semi-colon, or by beginning in a particular column, such that the critical circuit application ignores anything after that character or after that column.

In other embodiments, however, the critical circuit application can be configured not to ignore comments field 440. For instance, in the illustrated embodiment, the critical circuit application can be configured to parse any text after a separator (e.g., 444), in this case a pound sign, for special instructions or other additional text. Special instructions can be any instructions that cause the critical circuit application to process that particular circuit set differently than others. For instance, in the illustrated embodiment, the critical circuit application can interpret the phrase "no_div_avail" as an instruction to consider the circuit set diverse for statistical purposes, even if the circuits in the set share a common telecommunication resource (and thus are not actually diverse). This instruction can be used in those situations where, for example, there is only one transmission facility serving a particular service area, as indicated by field 448. For example, a switch in a remote mountain area might be served only by a single transmission radio. In this case, a telecommunication provider might not want the circuit set counted as a diversity violation since there would be no way to remedy the violation.

Similarly, there may be situations where, although the circuits in the set may be diverse according to the data obtained from provisioning database 216, the user might know that the circuits in fact are not diverse (for instance, if an engineer informs the user that the circuits use the same facility, which might for some reason be recorded under two different identifiers in provisioning database 216). An appropriate special instruction could cause the critical circuit application to consider the circuit set non-diverse even though it might appear diverse from the data obtained from provisioning database 216. Those skilled in the art will recognize that special instructions can configure the critical circuit application to take many other specialized actions when processing a particular line in an input file. In addition, as described below, special instructions and other additional text can be used to provide useful notations in diversity reports.

Figure 5A:
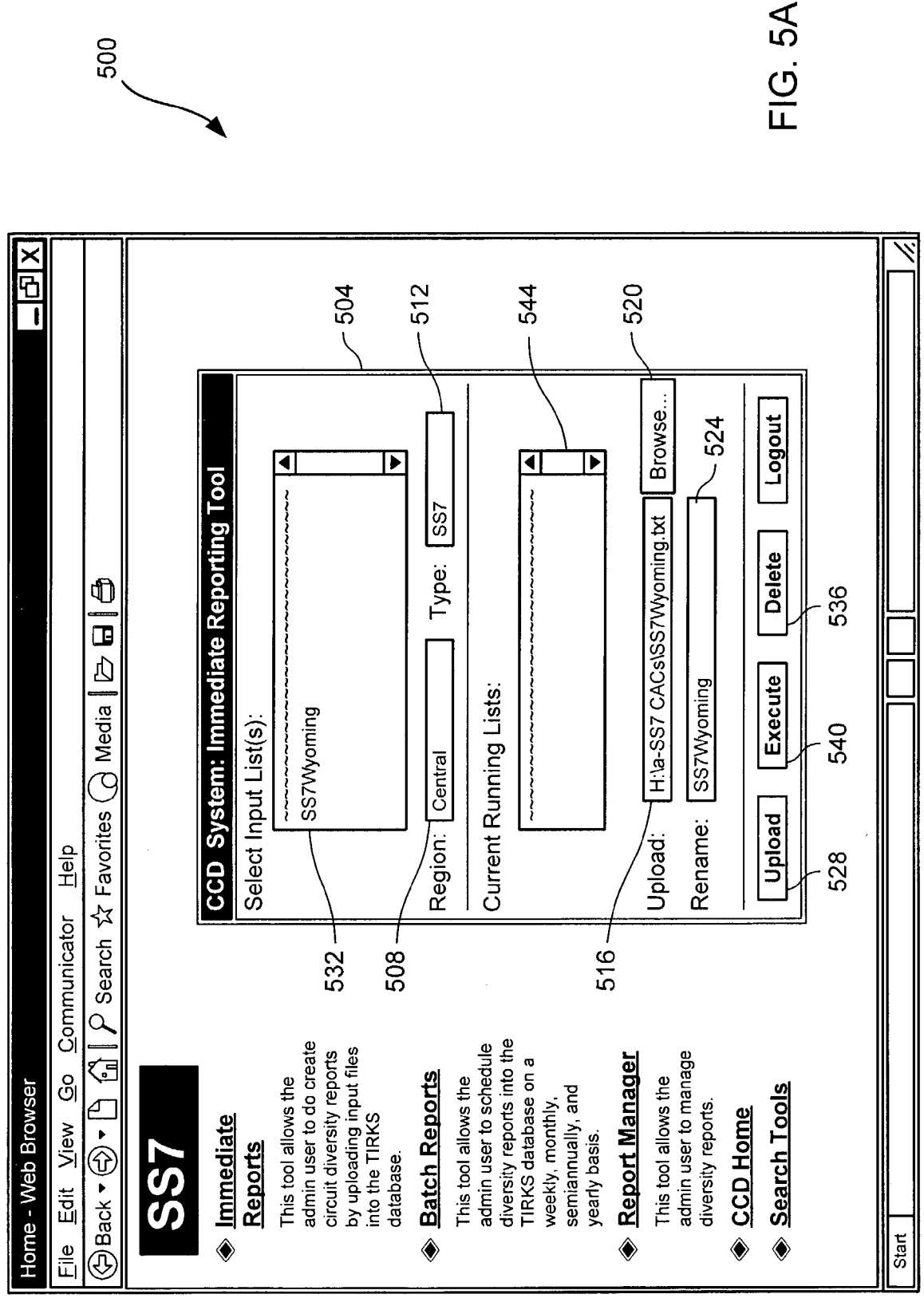
FIGS. 5A, 5B and 5C illustrate example screen displays that can be used to select input files for processing, according to certain embodiments of the invention.

In some embodiments of the invention, input file 400 is a plain-text flat file that can be created and edited using any text editor or word processor, regardless of platform or operating system. Such embodiments offer the benefit of flexibility, such that input file 400 can quickly and easily be created on any computing platform. In other embodiments, however, input file 400 could be a specially-formatted file, for instance tagged according to the eXtensible Markup Language ("XML") format familiar to those skilled in the art, or created by a commercial spreadsheet (e.g., Microsoft™ Excel™) or other application. The use of such specially-formatted files can provides enhanced compatibility with other platforms and applications. For instance, an input file created with Microsoft™ Excel™ might allow for easier data manipulation by the user than a plain text file would afford. Similarly, an XML-tagged file could be imported from another application that supports the XML specification, allowing for automated creation of input files. Those skilled in the art will recognize the many benefits of both plain-text files and specially-formatted files, and the choice between the two is discretionary FIG. 5A illustrates an example display screen 500 that can be used to submit an input file to the critical circuit application according to some embodiments of the invention. In the illustrated example, display screen 500 includes a window 504 allowing a user to provide the necessary data to submit an input file. In some embodiments, window 504 optionally can allow the user to provide values for the region 508 and circuit type 512 for all circuit sets in the input file. Referring back to FIG. 4, however, in other embodiments, input file 400 can include fields 412, 424 to allow a user to specify this information individually for each circuit set in input file 400, rendering fields 508 and 512 unnecessary. In still other embodiments, either the region and/or the circuit type may not be needed by the critical circuit application and therefore would not be collected from the user.

Window 504 also can include field 516 for providing the file name of the input file. It is important to note that the location of the input file is immaterial to the invention, so long as it can be accessed by the critical circuit application. Often, the input file will be stored locally on computer 228, which can be used to submit the file to the critical circuit application. In other embodiments, however, the file might be stored elsewhere (e.g., on a different computer 232 accessible through network 204). In such embodiments, the user can specify a remote location to search for the input file, for example by using a Uniform Resource Locator ("URL"), as is common in the art. Optionally, window 504 can include a button 520 that allows the user to browse for the input file, either locally or over network 204.

Figure 5B:
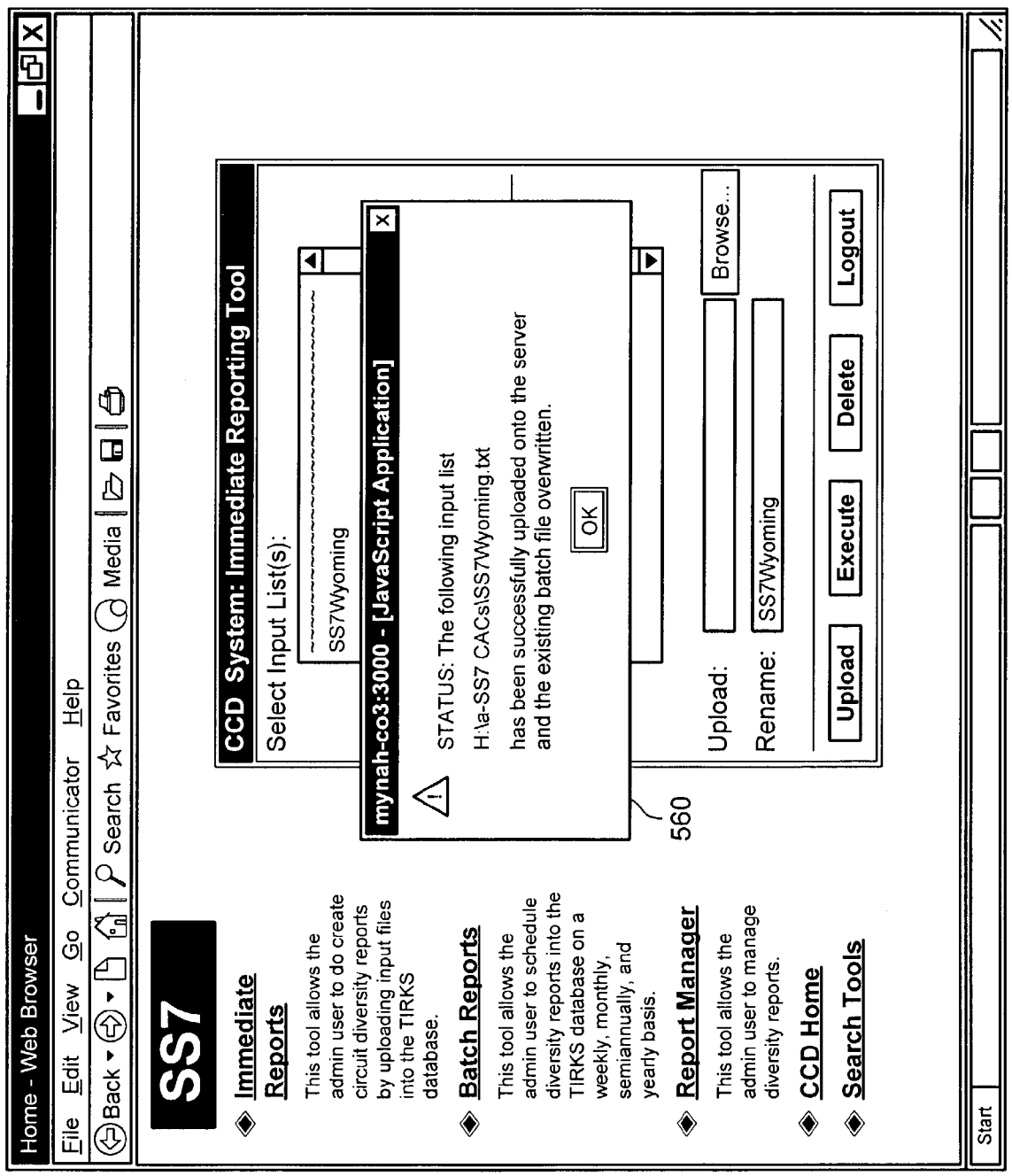

After the user has selected the desired input file, the user may rename the file to a more convenient or descriptive name using text box 524. The user then may upload the file to the critical circuit application for processing, for instance using button 528. Turning now to FIG. 5B, if the critical circuit application is able to upload the input file, it can display a confirmation message 560 to the user. In some embodiments, the critical circuit application will save all uploaded files indefinitely, perhaps on a storage medium attached to server 220, to allow for future and/or periodic processing, both of which are discussed in additional detail elsewhere. In a particular embodiment, the critical circuit application can overwrite a saved input file with a newly-uploaded file of the same name, providing an easy way to update saved files and thereby ensure that files used for periodic processing contain updated circuit set information. Optionally, the critical circuit application can warn the user before performing the overwrite, allowing the user to change the filename of either the new or existing file and preventing accidental replacement of the existing file.

Figure 5C:
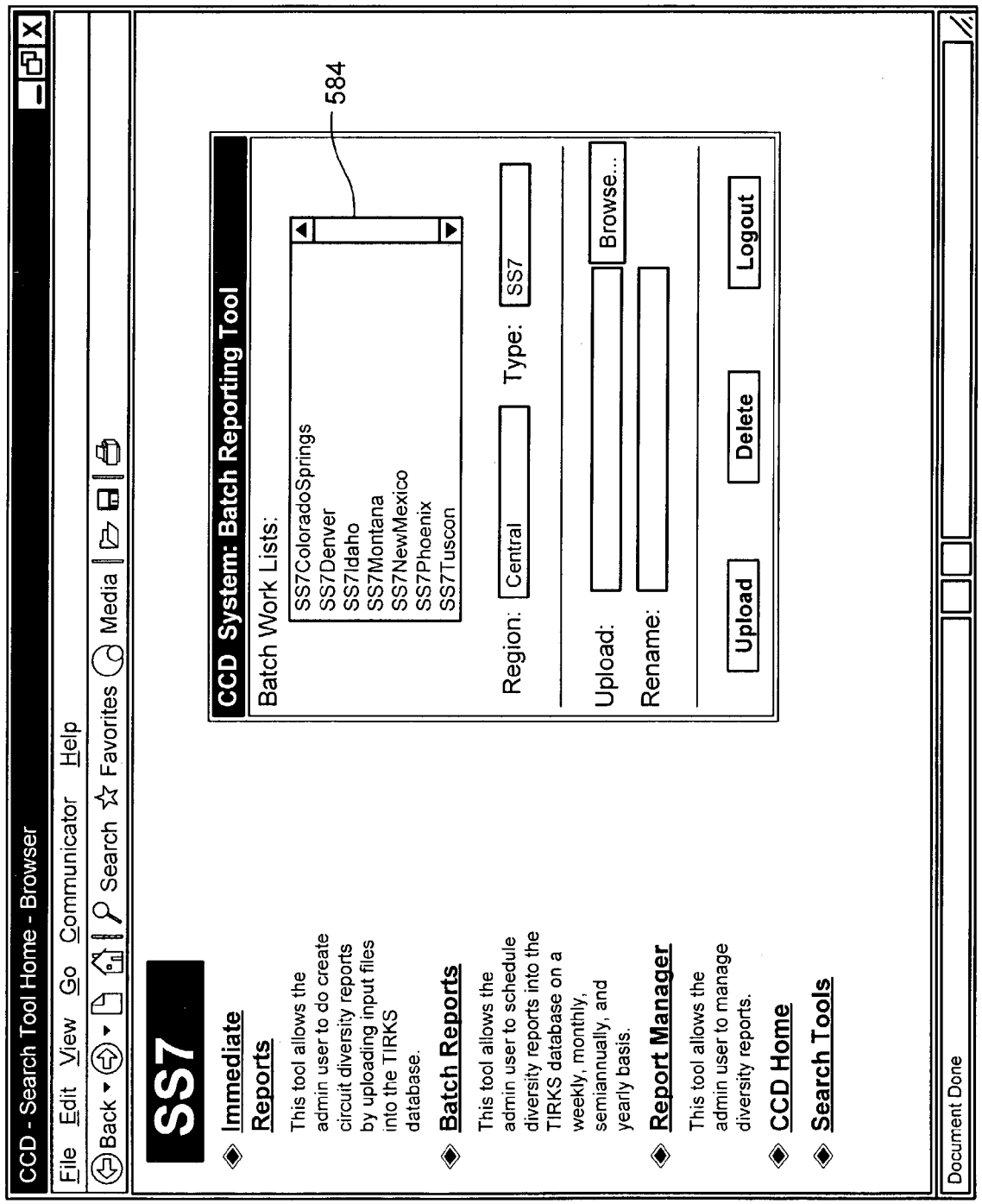

Alternatively to performing circuit analyses on an immediate basis, the critical circuit application also can allow for the upload of files to be processed on a periodic or batch basis. FIG. 5C illustrates an example display screen 580 that can be used to upload files for batch processing. Display screen 580 functions similarly to display screen 500, with the additional feature that for any files selected in window 584, the user optionally can specify batch processing rules, such as when and how often to process the files, how to deal with output reports and the like. Those skilled in the art will recognize, of course, that in certain embodiments, display window 500 easily could be used to provide both immediate and batch processing features, rendering display window 580 unnecessary.

Figure 6A:
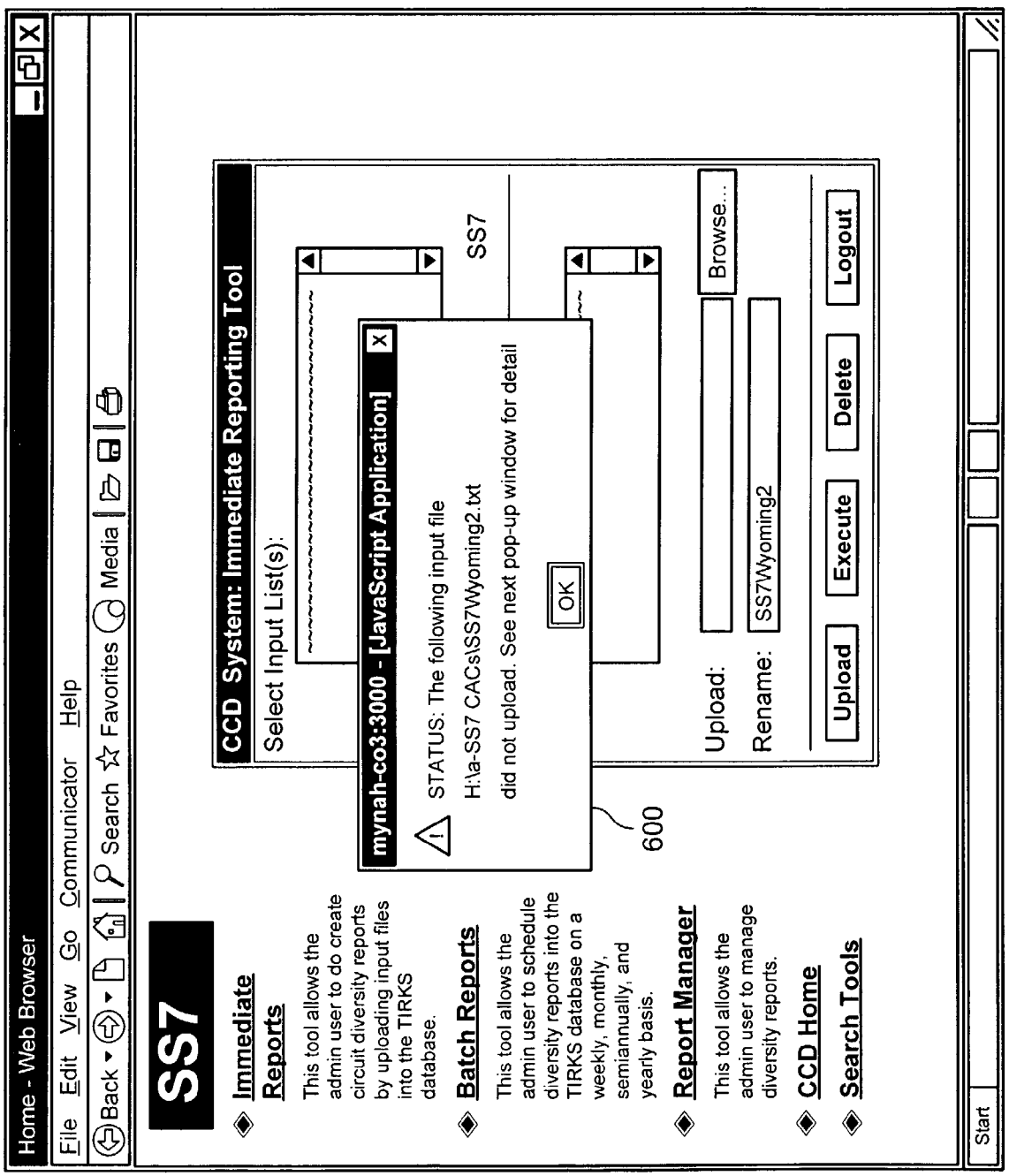
FIGS. 6A and 6B illustrate example screen displays that can be used to notify a user of the detection of input file errors, according to certain embodiments of the invention.
Figure 6B:
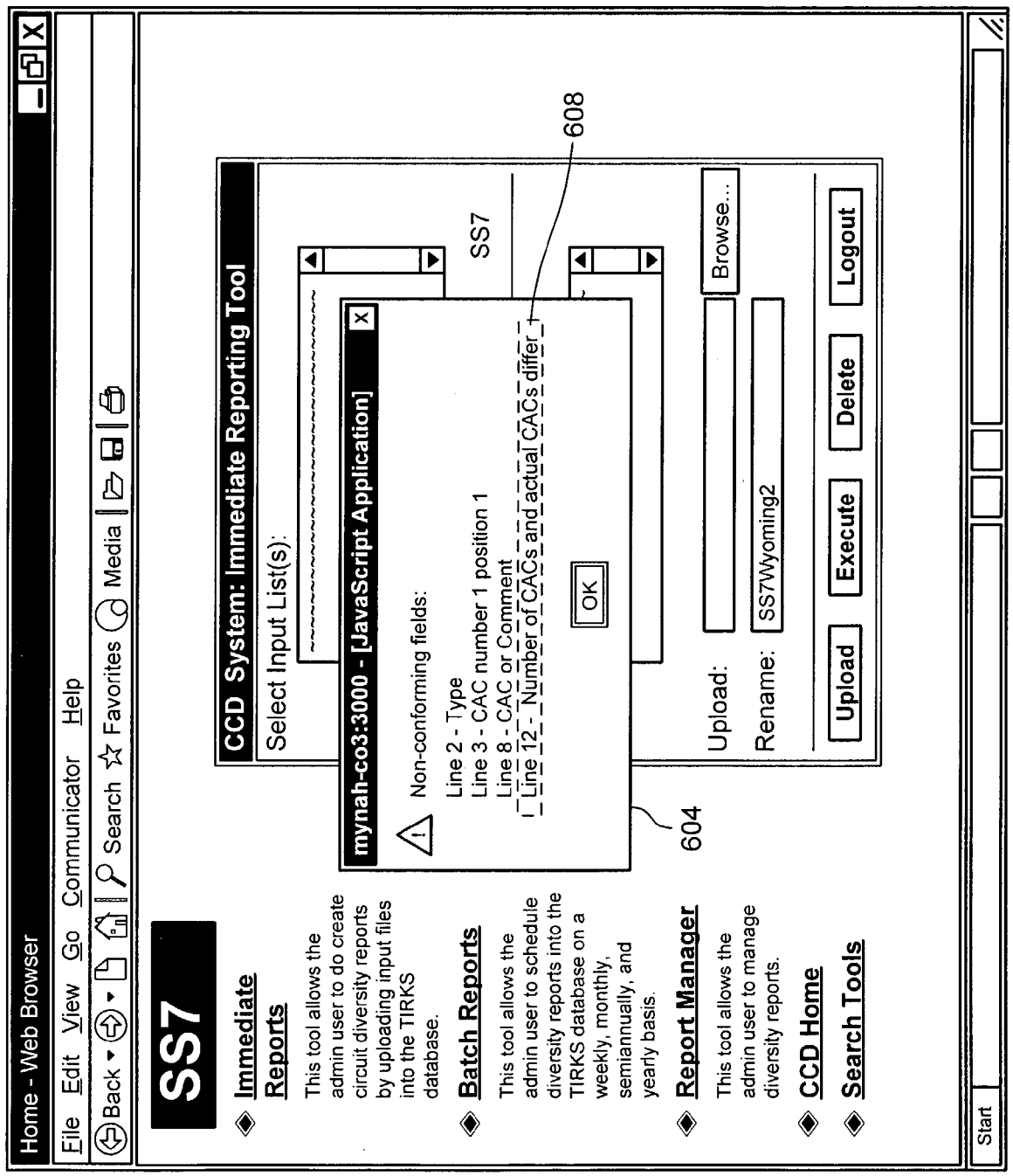

Returning to FIG. 3, in some embodiments of the invention, the input file optionally can be checked for errors before allowing the user to upload the file (block 312). For instance, FIG. 6A illustrates an example pop-up window 600 indicating that the input file could not be uploaded because of errors. Generally, the critical circuit application checks the input file only for formatting or syntax errors, such as mismatched fields and the like. In certain embodiments, however, the input file can be substantively checked before processing, perhaps by quickly checking provisioning database 216 for each of the listed circuits before accepting the input file for uploading. In one aspect, the critical circuit application not only indicates that errors have prevented a successful upload but also provides specific information about those errors. Merely by way of example, FIG. 6B illustrates a text box 604 that can notify the user of specific errors in the input file submitted to the critical circuit application. For instance, text box 604 includes error message 608, which notes that, on line 12 of the input file, the number of circuits identified differs from the specified size of the circuit set.

Depending on the embodiment, the critical circuit application can take several actions in response to errors in an input file. In some embodiments, the application simply refuses to accept the input file until the user manually corrects and resubmits the file. Alternatively, the critical circuit application can accept the file for processing despite the errors, perhaps while notifying the user that the output likely will contain errors as well. Finally, in some embodiments, the application can attempt to correct the errors, either automatically or with the interaction of the user. For instance, in response to error message 608, the application first could inform the user that the circuit set was defined as comprising two circuits but that only one circuit was identified, and then could give the user the opportunity to provide another circuit identifier. The critical circuit application could then update the file to include the correction and subsequently accept the corrected file for uploading.

Referring back to FIG. 5A, after the file has been uploaded successfully, the critical circuit application can display the filename in the input list display field 532, and the user can upload another file if desired, using the same process. The user also can remove any selected files from the application using button 536 if, for instance, the user determines that a particular file should not have been uploaded.

Turning back to FIG. 3, after the critical circuit application has received input (whether from a submitted file or through other means) identifying circuit sets, the identified circuit sets are processed by the application. In block 316, the critical circuit application identifies each of the circuits to be analyzed in a particular circuit set. In this context, identification simply means any process by which the critical circuit application determines circuits for which analysis is required. For instance, in certain embodiments, identification comprises parsing an input file to determine the circuits to be identified. In other embodiments, identification can comprise interpreting an HTML form or electronic mail message submitted by the user. In certain embodiments, for instance, where more than one provisioning database 216 is implemented, identification of the circuits can include associating each circuit with the correct provisioning database 216. Those skilled in the art will recognize that in certain embodiments, the procedures represented by blocks 312 and 316 can be combined into a single step.

In some embodiments, in block 320, the critical circuit application accesses provisioning database 216 and searches provisioning database for each identified circuit. As described above, database search methods are well-known in the art, and any method of searching is acceptable so long as it can retrieve all pertinent information from provisioning database 216 relative to a selected circuit. As described above, pertinent information can include all information relating to the equipment, facilities, and/or physical locations associated with the selected circuit. The pertinent information is then downloaded from provisioning database 216 into the critical circuit application.

Optionally, the critical circuit application can store the information in critical circuit database 224 (block 324). Storing the information provides several benefits. For instance, consistently storing the information about every critical circuit analyzed creates a comprehensive database containing critical circuits and all associated facilities, equipment and/or physical locations, which facilitates additional features, such as searching, which is described in detail below. Moreover, in certain embodiments, storing circuit information in critical circuit database 224 enables more efficient diversity analyses, since the critical circuit application need not access provisioning database 216 to perform a diversity analysis if information about the circuits to be analyzed already exists in the critical circuit database 224. (Of course, as discussed above, it sometimes will be desirable to re-download circuit information from provisioning database 216 to ensure that the information in critical circuit database is current).

In block 328, a circuit set is analyzed for diversity. The diversity analysis comprises comparing the relative telecommunication resources associated with each circuit. As discussed above, depending on the embodiment, different criteria can be used to define diversity. For ease of description, however, this example assumes a set comprising two circuits, such that the set is considered diverse if the circuits share no common telecommunication resources. Thus, if the two circuits occupy channels on the same DS1 line, for example, the information downloaded from provisioning database 216 for each circuit will include that DS1 line in the list of facilities used. The critical circuit application therefore would determine that the set contains a diversity violation.

In similar fashion, the critical circuit application can analyze each of the circuit sets submitted at block 308. The procedures in blocks 316–324 can be repeated as necessary, for each circuit in a given set, as well as for multiple circuit sets in a particular group. Notably, the order in which these and other procedures in method 300 are performed or repeated is discretionary. For instance, in some embodiments, the critical circuit application will identify all circuits before accessing the circuit information provisioning database 216, while in other embodiments, the critical circuit application can identify and access information for a single circuit before identifying the next circuit in a set. Similarly, an entire set may be analyzed before the circuits in the next set are identified, or, alternatively, information all of the circuits in each set from a particular input file can be accessed before analyzing any of the sets.

After analyzing a circuit set (or a group of circuits sets) the critical circuit application can generate one or more reports of its analyses (block 332). In certain embodiments, the report can comprise an output file. In one particular embodiment, for each input file accepted in block 308, the critical circuit application will create a corresponding output file. In other embodiments, the critical circuit application can create discrete output files categorized in many different ways, for example for each circuit set analyzed, for each type of circuit analyzed, or for each LATA analyzed. Those skilled in the art will recognize that there are many other methods of organizing output into files, each of which can be accommodated by the present invention. Alternatively, the report might be output in other methods, for example as a dynamically-created web page transmitted to a web browser running on computer 228 or as an electronic or facsimile message.

In certain embodiments, one or more users can be notified when an output report has been generated. For instance, FIG. 7 illustrates an example electronic mail message 700 informing a user that a diversity analysis has been performed and that a report is ready for viewing. Optionally, such a message can include the report itself (as text or as an attachment) and/or a hyperlink 704 to the location of the report (if saved as a file), in order to facilitate the review of that report. Those skilled in the art will appreciate that many other notification methods are possible, including pager messages, telephone messages, other electronic messages and the like. In fact, if a printer is available, the critical circuit application automatically could print a notification message (or even the output report itself) to be routed to the proper user. The recipients of the notification are, of course, discretionary and could include, merely by way of example, managers, technicians, engineers and anyone else who might have an interest in the diversity analysis.

FIG. 8A illustrates an example screen display 800 that can be used to report the results of a diversity analysis according to certain embodiments of the invention. In this example, screen display 800 depicts a web browser window displaying the contents of an HTML document created by the critical circuit application. In certain embodiments, the critical circuit application can provide diversity reports for all circuit sets within a particular input file. Alternatively, in addition to the categories mentioned above, reports could be provided for different groups of circuit sets within one or more input files, categorized by location, status (e.g., diverse or not diverse), type of circuit, and the like. In the illustrated embodiment, the diversity report for each circuit set can be preceded by a header (e.g., 804). The header can include labels indicating the input filename 808 (if applicable), the type of circuits in the circuit set 812, the geographic region of the circuit set 816, and the LATA in which each of the circuits in the set can be found 820. (Of course, in some embodiments, a circuit set might comprise circuits from different geographic locations or LATAs, or circuits of different types. In such embodiments, labels 812, 816, 820 optionally can be modified or omitted to accommodate any such variation within a circuit set). Those skilled in the art will recognize that a variety of other labels describing the analyzed circuit set could be included in header 804 as well.

In some embodiments, information in header 804 can be obtained from the input file used to identify the circuit sets to be analyzed. For instance, turning back to FIG. 4, example input file 400 contains fields indicating the circuit type 412, geographic region 424, and LATA 428 of each circuit set. The information in these fields can be used by the critical circuit application to create labels in header 808. Alternatively, the critical circuit application could acquire header information from another source, perhaps provisioning database 216 or another database, or could derive the header information from the circuit identifiers themselves. Those skilled in the art will recognize that there are a variety of ways to determine such information.

As illustrated in FIG. 8, header 808 also can include one or more comments 824 about the circuit set. In certain embodiments, the critical circuit application can incorporate information from field 440 in the input file into comments section 824 of header 808. Thus, in addition to providing instructions to the critical circuit application (as described above), the comments field 440 in the input file can be used to provide notes 824 in the diversity report in order to help a reader to interpret the results of the diversity analysis.

In addition to header 808, the diversity report for a circuit set also can describe each of the circuits in the set. For instance, example screen display 800 provides the circuit identifier (e.g., 828) and customer name (e.g., 832) for each circuit. Additional identifying information about the circuits (e.g., 836), which can include the CLLI codes for the origination and termination points of the circuits, can be displayed as well. As described above, depending on the embodiment, such information can be obtained from an input file, provisioning database 216, or any of a variety of other sources. In accordance with certain embodiments of the invention, other data can be provided about the circuit as well.

For example, a field (e.g., 840) can be provided indicating whether the circuit has been re-provisioned (i.e., whether it has become associated with any new telecommunication resources) since the last time it was analyzed. According to certain embodiments, provisioning database 216 and/or critical circuit database 224 can maintain historical information about each circuit, allowing a user to see any such changes over time. Alternatively, the critical circuit application can compare the current circuit information (for instance, that obtained from provisioning database 216 in block 320) with the information about that circuit stored in critical circuit database 224.

In other embodiments, the diversity report can contain a field (e.g., 844) indicating that the circuit has a pending status in provisioning database 216. A circuit can be given a pending status if, for instance, a reprovisioning order has been given (but not yet completed) for that circuit, perhaps via provisioning system 212. Such information can be useful because it indicates that the diversity status of any circuit set containing that circuit possibly could change. In certain embodiments, the critical circuit application can be configured to treat pending circuits according to given rules. For example, in some embodiments, the critical circuit application will mark any circuit set with a pending circuit as not diverse, prompting the user to process the circuit set at a later date. In other embodiments, the critical circuit application can be configured to re-analyze any circuit set containing a pending circuit after a certain delay (e.g., a day, a week or a month later). In still other embodiments, the critical circuit application will not even analyze a circuit set containing a pending circuit. Those skilled in the art will recognize that the handling of such circuit sets is discretionary and that the critical circuit application can accommodate many varied practices.

Importantly, if the circuits in a given set are diverse (as defined in accordance with the particular embodiment), the diversity report can contain a notation 840 informing the user of that fact. On the other hand, as illustrated in FIG. 8B, if the analysis of a circuit set determines that the circuit set is not diverse, the critical circuit application can notify the user of that fact as well. For instance, example display screen 860 illustrates a diversity report for a circuit set that includes a diversity violation, according to certain embodiments of the invention. The diversity report includes a header 864, as well as descriptions of the circuits in the examined circuit set, similar to display screen 800 described with respect to FIG. 8A. Notably, as illustrated by example screen display 860 and described above, comments section 868 can include a comment from the input file, which can be useful in helping the user to interpret the results of the diversity report. Merely by way of example, comments section 868 includes the comment "no div avail," which might indicate to the user that, even though the circuit set contains a diversity violation, no remedial action need be taken with respect to that diversity violation, since the telecommunication provider lacks the equipment and/or facilities to ensure diversity of that particular circuit set.

If a given circuit set contains a diversity violation, the diversity report also can provide information about the violation. For instance, in the circuit set exemplified by FIG. 8B, the circuit set exhibited several diversity violations. First, the circuits in the set share three cables, as illustrated by lines 872A, 872B, 872C. In example display screen 860, the cables are described by their termination points and cable numbers, which, as those skilled in the art will appreciate, are sufficient to identify the shared cables for further analysis. In some embodiments, however, additional information about the cables can be provided, or lines 872A, 872B, 872C can include hyperlinks which, when selected, link to additional information about the cables. Merely by way of example, such additional information could include more specific identifying information, such as an English translation of the termination point identifiers, or a list of alternative cables that could be used by the circuits in the set, such that a user easily could identify any available cables to remedy the diversity violation. Such information could be obtained, for example, from provisioning database 216, or it could be stored locally at critical circuit database 224 for easy access. Those skilled in the art will recognize as well that such information about telecommunication resources can be stored in many varied locations, each of which can be accessible by the critical circuit application.

Likewise, the circuit set illustrated by example display screen 860 includes two diversity violations related to the facilities over which the circuits travel, as described by lines 876A, 876B, which indicate the termination points, the facility number and the facility type of the shared facilities. Finally, the circuits in the illustrated set share a common element of telecommunication equipment, identified by line 880, which optionally can identify the location (e.g., the rack) where the shared equipment can be found. As described above, while the illustrated embodiment provides sufficient information to allow for identification of the shared resources, certain embodiments can provide additional information and/or hyperlinks for the identified telecommunication resources, including, for instance a detailed description of the type of equipment.

In other embodiments, example display screen 860 can also enable the user interactively to remedy any diversity violations. For example, for shared resources that can be controlled electronically, display screen 860 could enable the user to move one or more circuits off of the shared cables, equipment and/or facilities onto a diverse equivalent, perhaps by sending an electronic command to switch 236. Alternatively, display screen 860 could provide a link to provisioning system 212 to allow the user manually to re-provision any non-diverse circuits. For changes that must be performed physically, the critical circuit application could provide a link to enable the user easily to send an electronic message to the appropriate technician, authorizing the desired changes and providing any necessary information to facilitate the changes.

In still other embodiments, the critical circuit application could offer proposed changes (which could remedy the diversity violation) to the user, perhaps based on a search of provisioning database 216 and/or critical circuit database 224 for suitable alternative resources. In such embodiments, the critical circuit application optionally could allow the user to confirm such changes, at which point the critical circuit application could perform the necessary tasks to effect the changes, whether through communication with provisioning system 220, via electronic mail messages to appropriate technicians, or through other means.

Figure 9:
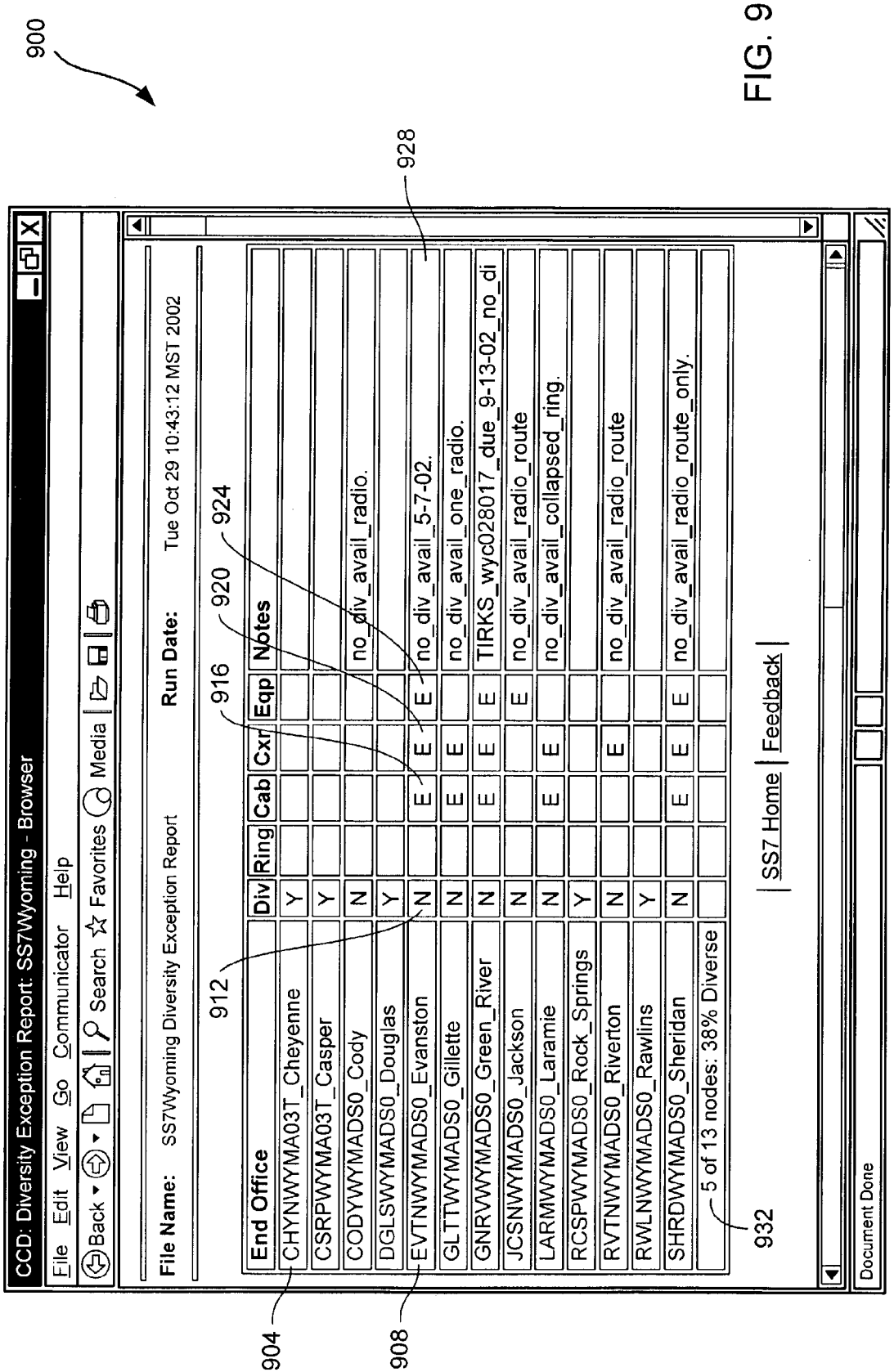
FIG. 9 illustrates an example screen display that can be used to provide a diversity summary for a group of circuit sets, according to certain embodiments of the invention.

Other types of output reports can be produced as well. For instance, FIG. 9 illustrates an example display screen 900 that can be used to provide a summary of all the diversity analyses for a particular group of circuit sets. Merely by way of example, if a particular input file contains a plurality of circuit sets to be analyzed, display screen 900 can be used to provide a summary of all of the sets in that group. Such a summary report can take any of the forms described above with respect to diversity reports.

In the illustrated embodiment, screen 960 shows a web browser displaying an HTML document containing the diversity summary report. For convenience, in the illustrated embodiment, each set is identified by the end office where the set is located (e.g., 904, 908), which, in this example, was taken from comments field (e.g., 440) of input file 400, as illustrated by FIG. 4. Those skilled in that art will recognize, however, that many other ways of labeling the circuit sets are possible in such a summary. In certain embodiments, each label (e.g., 904, 908) can be a hyperlink, such that selecting the label will prompt the critical circuit application to display a diversity report (for instance, as described above) for that particular circuit set. In other embodiments, the summary report depicted in FIG. 9 can be included as an appendix to the detailed diversity reports discussed above.

On example display screen 900, next to the identification of each circuit set, there is a notation (e.g., 912) indicating whether the circuits in the set were found to be diverse. If the circuits in that set are not diverse, display screen 900 also can indicate the nature of any diversity violations. Merely by way of example, for the Evanston end office, diversity violations (or "exceptions") were found for the cables (indicated by notation 916), the facilities (indicated by 920) and the equipment (indicated by 924) used to provision those circuits. In similar fashion to the diversity reports described above, display screen 900 also can display any additional comments (e.g., 928), such as those included in input file 400. In the illustrated embodiment, for example, the critical circuit application can be configured to display any special instructions or additional text (e.g., 448), which, as described above, also can be used to configure the critical circuit application. In this case, comments 928 inform the user that no diversity is available for the illustrated circuit set. As noted above, other comments are possible as well, including for example comments that explain why a set is in fact diverse or not diverse, when the diversity analysis indicates otherwise.

In accordance with certain embodiments of the invention, comments field 928 can be interactive, such that the user can enter any additional comments, for instance the status of any ongoing plan to remedy the violation. In some such embodiments, comments field 928 (or, alternatively, another field), can be used to track the history of such plans, including workflow tools familiar to those skilled in the art, such as time-stamping any updates to the field, assignment and tracking (including due dates and projected costs) of particular tasks, information about responsible parties (including, for instance, the phone number, electronic mail address, supervisor and/or department of each responsible party) and the like. Optionally, comments field 928 can be linked to one or more separate, categorized documents used to provide such workflow features. In fact, certain embodiments allow a user to open one or more additional windows linked to the circuit set. Such windows can provide these workflow capabilities, as well In some embodiments, display screen 900 also can be used to provide statistics for a particular group of circuit sets. Thus, for instance, if a single input file contains all the critical circuit sets for a particular LATA or geographic region, the critical circuit application, can provide LATA-wide or region-wide statistics. Merely by way of example, display screen 900 provides a calculated ratio 932 of the number of diverse circuit sets to the number of sets in the group. Those skilled in the art will recognize that a variety of statistical analyses could be performed to provide additional information to the user. Notably, as discussed above, any special instructions (e.g., 448) can be used to adjust the statistics accordingly. For instance, a provider may wish to have circuit sets for which no diversity is available counted as diverse for statistical purposes, since nothing can be done to remedy the diversity violation. Conversely, a special instruction could be used to force the critical circuit to count a circuit set as non-diverse even though the set appears diverse when analyzed.

In some embodiments, the critical circuit application can be configured to perform analyses on a scheduled and/or periodic basis. Hence, as described above, a particular input file can be saved in a location accessible by server 220, and the critical circuit application can process the input file periodically. This periodic processing can provide many benefits, including the continual refresh of critical circuit database 224 with updated information from provisioning database 216. An additional benefit is the ability to track changes in the diversity status of circuit sets over time and, if desired, to maintain statistics about the diversity analyses. Merely by way of example, while display screen 900 indicates that the circuit sets in the input file currently are 38% diverse, the diversity analyses performed for those sets could enable the telecommunication provider to remedy some of the diversity violations, such that the next time the same input file was processed, the diversity statistics would be improved. In this way, a provider can set diversity goals and track its progress in attaining those goals.

Figure 10:
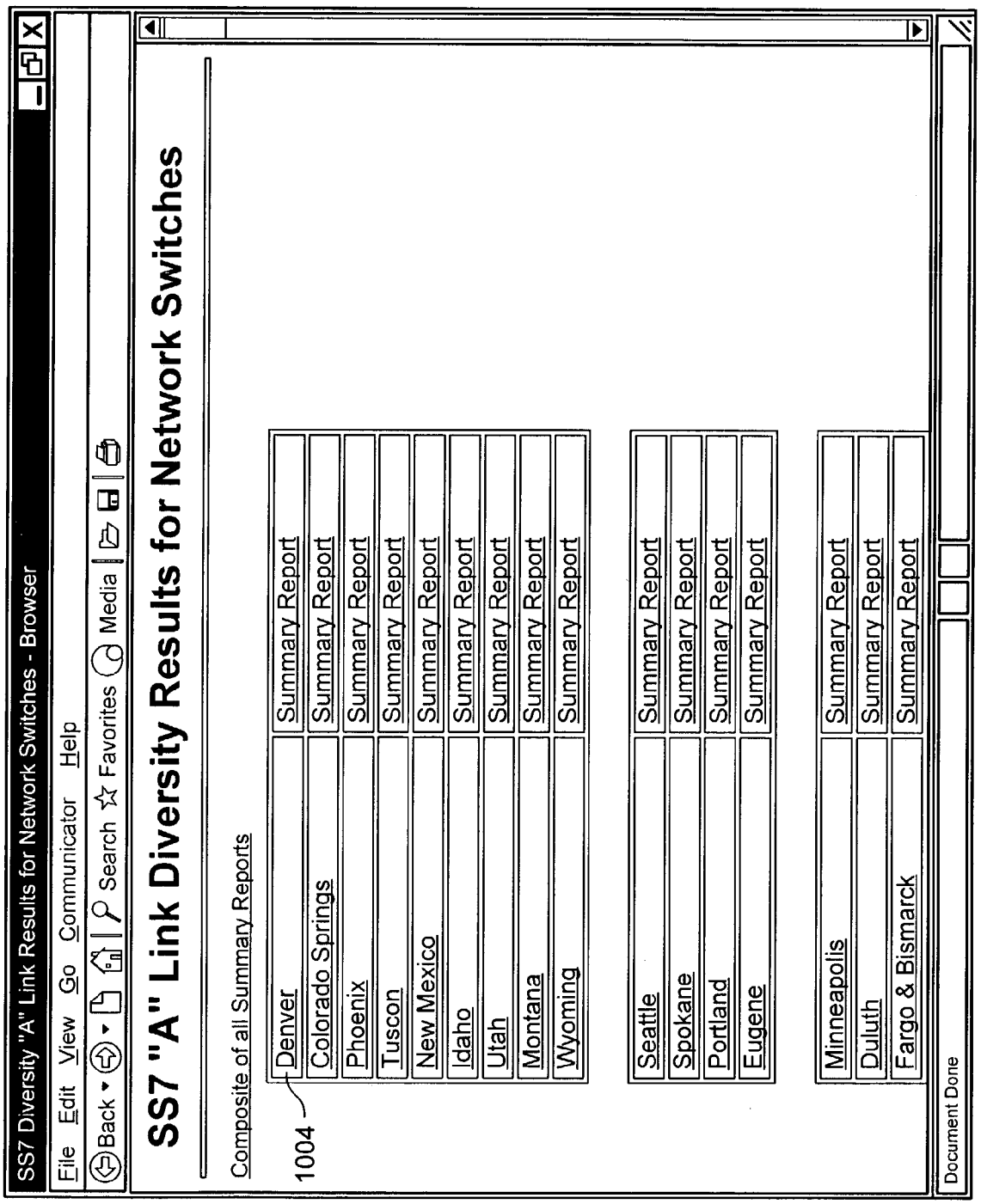
FIG. 10 illustrates an example screen display that can be used as an index of diversity summaries, according to certain embodiments of the invention.

As illustrated by FIG. 10A, the critical circuit application is also capable of storing summary reports and displaying a composite listing 1000 of all stored summary reports. In certain embodiments, each entry (e.g., 1004) on composite listing 1000 is a hyperlink to the summary report itself. In this way, a user quickly and easily can navigate between large numbers of summary reports. In other embodiments, for instance, where certain input files are processed periodically, composite listing 1000 can include entries for different versions of each summary report, perhaps noting the date on which each version was created.

Figure 11:
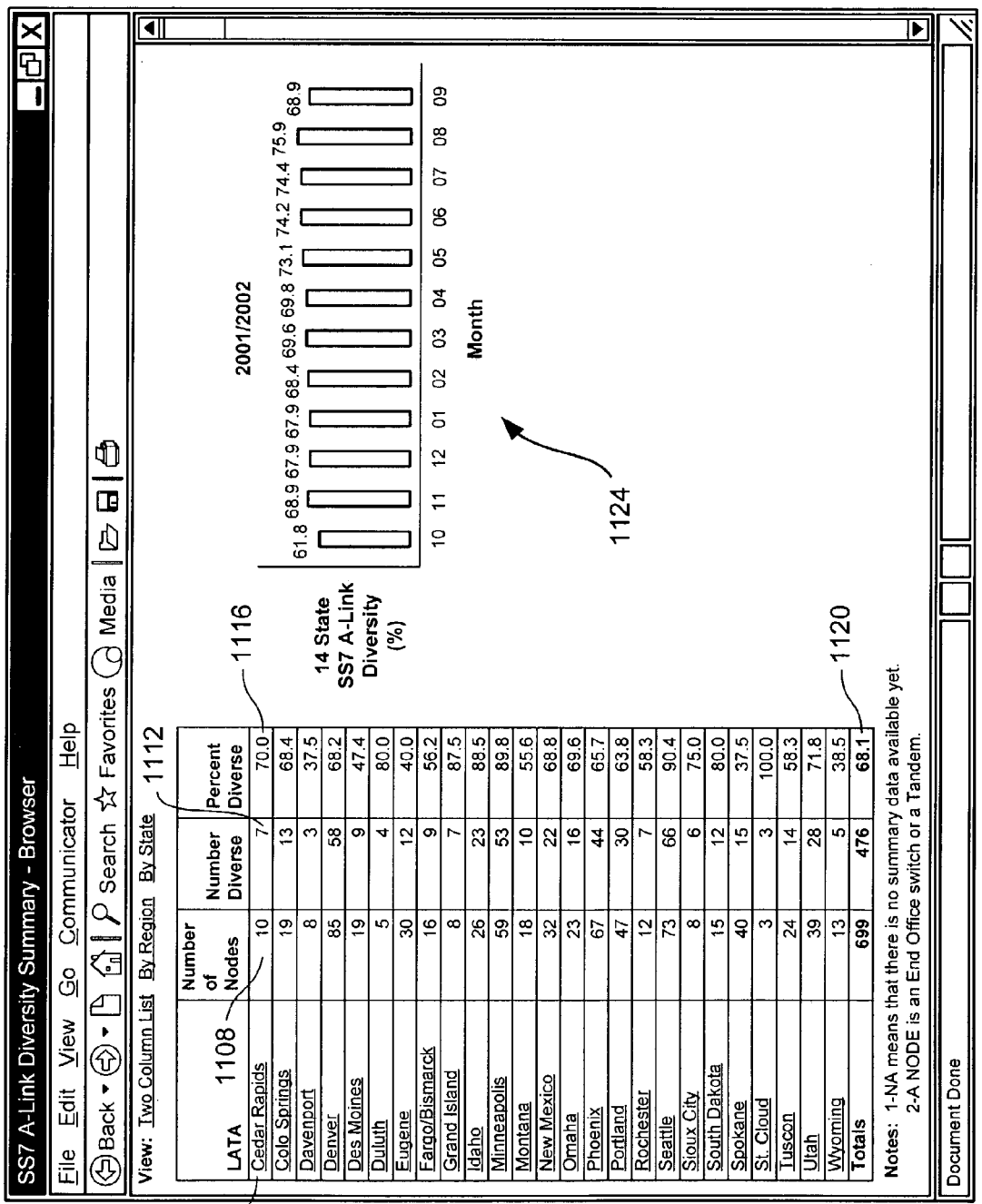
FIG. 11 illustrates an example screen display that can be used to view a circuit diversity summary of multiple groups of circuit sets, according to certain embodiments of the invention.

The critical circuit application also can be configured to display other information about each summary report, such as the number of circuit sets analyzed in that report and/or the diversity ratio of the circuit sets analyzed. For instance, FIG. 11 illustrates a diversity summary report 1100 identifying each circuit group analyzed (e.g., 1104), and displaying the overall number of circuit sets (e.g., 1108), the number of diverse circuit sets (e.g., 1112) and the calculated diversity ratio (e.g., 1116) for that group. Diversity summary report 1110 also can display the overall diversity ratio 1120 for all analyzed groups, and, as described above, can track diversity statistics over time. For instance, chart 1124 depicts a summary of the overall diversity ratio 1120 over a rolling, twelve-month period. As mentioned above, however, those skilled in the art will appreciate that a variety of other statistical treatments could be applied to the diversity analysis to enable more sophisticated interpretation of the data.

In accordance with some embodiments, the present invention provides the ability to search for information about a particular telecommunication resource or set of resources associated with one or more critical circuits and/or to search for critical circuits themselves. In a particular embodiment, the critical circuit tool can search provisioning database 216 for the desired information. In other embodiments, however the critical circuit tool can search critical circuit database 224, either alone or in combination with provisioning database 216, and/or can search any other appropriate data source.

Searching a separate database (e.g., critical circuit database 224) can be advantageous in certain embodiments, such as those where provisioning database 216 may not be available for searching, either because of operational constraints (e.g., computing resource availability) or other reasons. On the other hand, while the discussed embodiments sometimes refer to searches of critical circuit database 224, it should be remembered that in some embodiments it is possible to perform such searches in provisioning database 216 or another data source, and in such embodiments provisioning database 216 or other data source simply can be substituted for critical circuit database 224.

As mentioned above, according to some embodiments, critical circuit database 224 includes information about every critical circuit in a provider's inventory, as well as information about every telecommunication resource associated with each of those critical circuits. In one aspect, critical circuit database 224 can be populated with this information through process 300 depicted on FIG. 3, which provides an efficient method for gathering data on critical circuits. Alternatively, however, information about critical circuits and associated telecommunication resources can be inserted into critical circuit database 224 in many other ways familiar to those skilled in the art, including, for example, batch transfers of information from provisioning database 216, structured database queries using SQL or some other database protocol, manual entry of information, and the like.

Figure 12A:
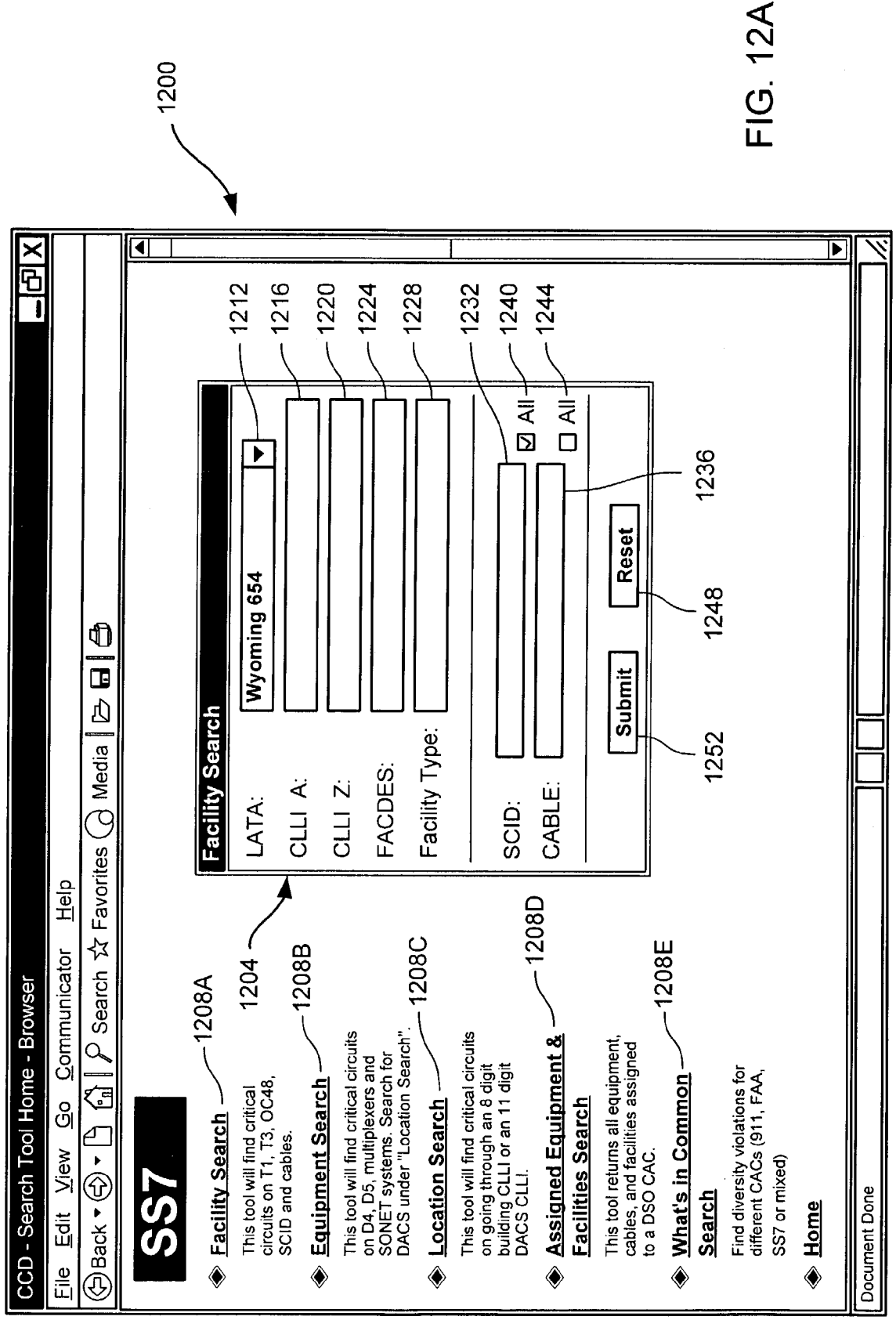

Regardless of how critical circuit database 224 is populated with information, however, various embodiments of the invention allow for efficient searching of such information. For example, FIG. 12A illustrates an example screen display 1200 that can be used to perform searches of critical circuit database 224 for one or more facilities using window 1204. In addition, example screen display includes links 1208A–E to other search forms described in detail herein, allowing for easy navigation between different types of searches. In addition, it should be noted that, while the embodiments described herein allow for various searching techniques, the invention is not limited to the specific searches described herein. Indeed, any combination of circuits and telecommunication resources can be searched according to the invention.

In the illustrated example, window 1204 can be used to enter criteria by which to search for facilities. Those skilled in the art will appreciate that, in accordance with certain embodiments, including those illustrated by FIGS. 12–16, users can enter any combination of search criteria in order to find a desired subset of circuits and/or telecommunication resources. Moreover, certain embodiments can perform a search using no search criteria, and such search therefore could return a listing of all critical circuits and/or resources in critical circuit database 224, from which the user could select a desired circuit or resource, or, alternatively, narrow the search by providing search criteria and re-running the search. This process can, of course, be performed iteratively.

Figure 12B:
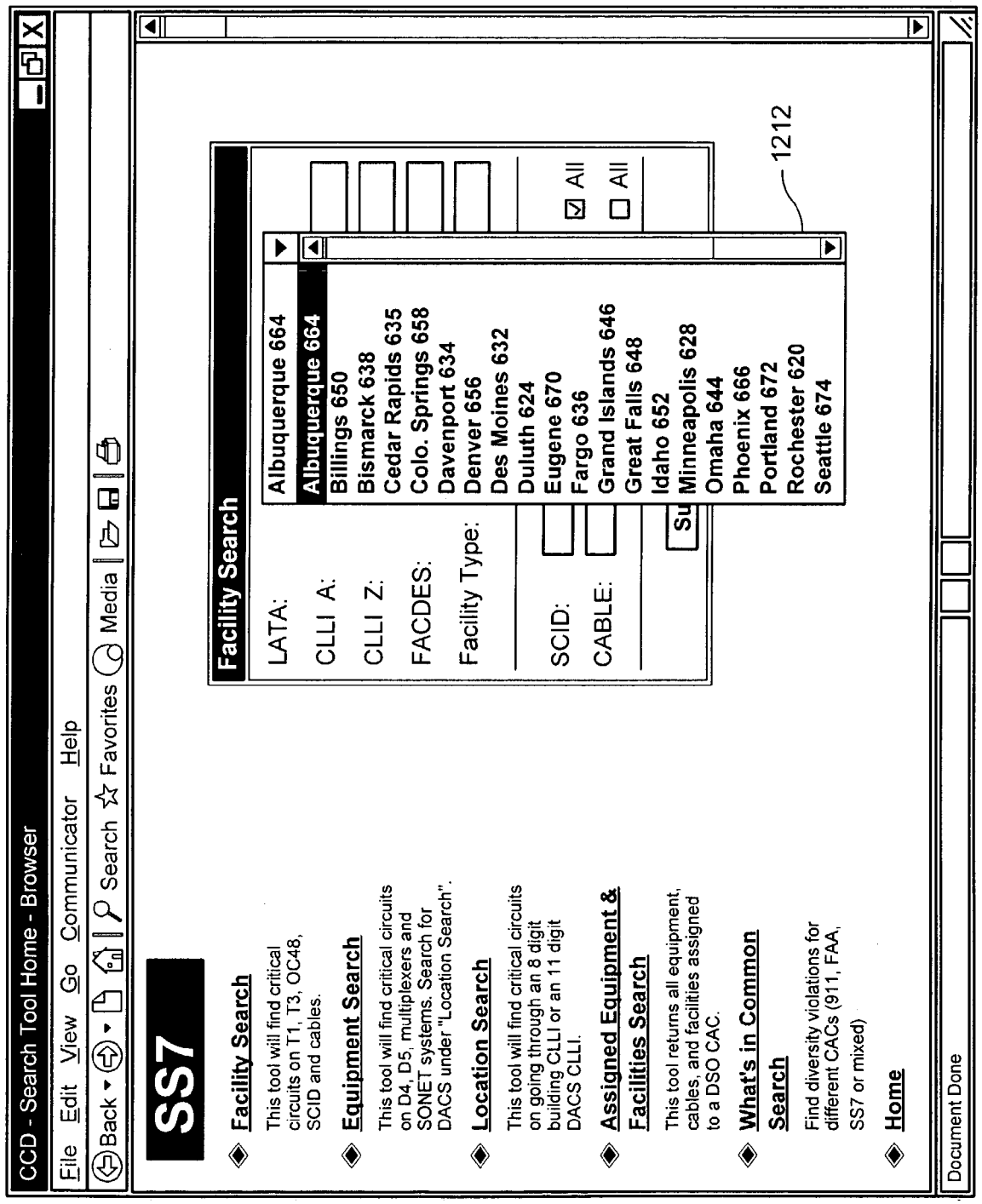

In the illustrated embodiment, window 1204 includes LATA field 1212, which permits a user to search only from among equipment located within a particular LATA (or a set of identified LATAs). In other embodiments, other geographical divisions, such as states or regions, also could be used as possible search criteria. As illustrated by FIG. 12B, LATA field 1212 optionally can be a pull-down menu preconfigured to allow a user to select among a variety of available LATAs as a search criterion. Those skilled in the art will recognize that LATA field 1212, as well as for other fields illustrated on this and other figures, can utilize a variety of data input methods, including text fields, radio buttons, check boxes, pull-down menus and the like.

Returning now to FIG. 12A, window 1204 can include other fields allowing the user to provide additional or alternative selection criteria. For instance, the user can provide the originating location for a particular facility using field 1216; depending on the embodiment, the originating location can be specified using a CLLI code or via another identifier, such as a ZIP code, the English name of the originating location, and the like. Similarly, the user can provide the terminating location for the facility using field 1220. (Those skilled in the art will recognize that the terms "terminating" and "originating" can be applied interchangeably in many embodiments.)

In some embodiments, a user can specify a particular facility designator as a search criterion, e.g., using field 1224. A facility designator can be any identifier that, either alone or in combination with other information (e.g., CLLI codes for the originating and terminating offices) can serve uniquely to identify a particular circuit. Thus, for example, if there are multiple circuits between the same two offices, each could have a different facility designator. Note, however, that in certain embodiments, two circuits with different originating or terminating locations could have the same facility designator, since their disparate originating and/or terminating locations would serve as uniquely identifying elements. In other embodiments, a user can specify that only facilities of a particular type be searched, for example, using field 1228. For instance, a user might specify that the search return only DS1 lines meeting other specified search criteria or, alternatively, all OC48 lines within a particular LATA or region.

In some embodiments, the user can search for a particular SONET carrier using field 1232 or a particular cable using field 1236. In one aspect, such facilities can be assigned an identifier, perhaps by provisioning system 212, and this identifier can be used as a search criteria. Alternatively, by selecting checkboxes 1240, 1244, the user can search for all SONET carriers or cables (or, in other embodiments, other types of facilities), respectively, associated with at least one critical circuit. Such a search can be narrowed by specifying geographic criteria as described above, perhaps by using LATA field 1212. In accordance with certain embodiments, a user may, at any point, choose to clear the presently selected criteria and start over, perhaps using reset button 1248. When the desired criteria have been specified, the user can submit the search criteria to the critical circuit application, for instance using button 1252.

Figure 12C:
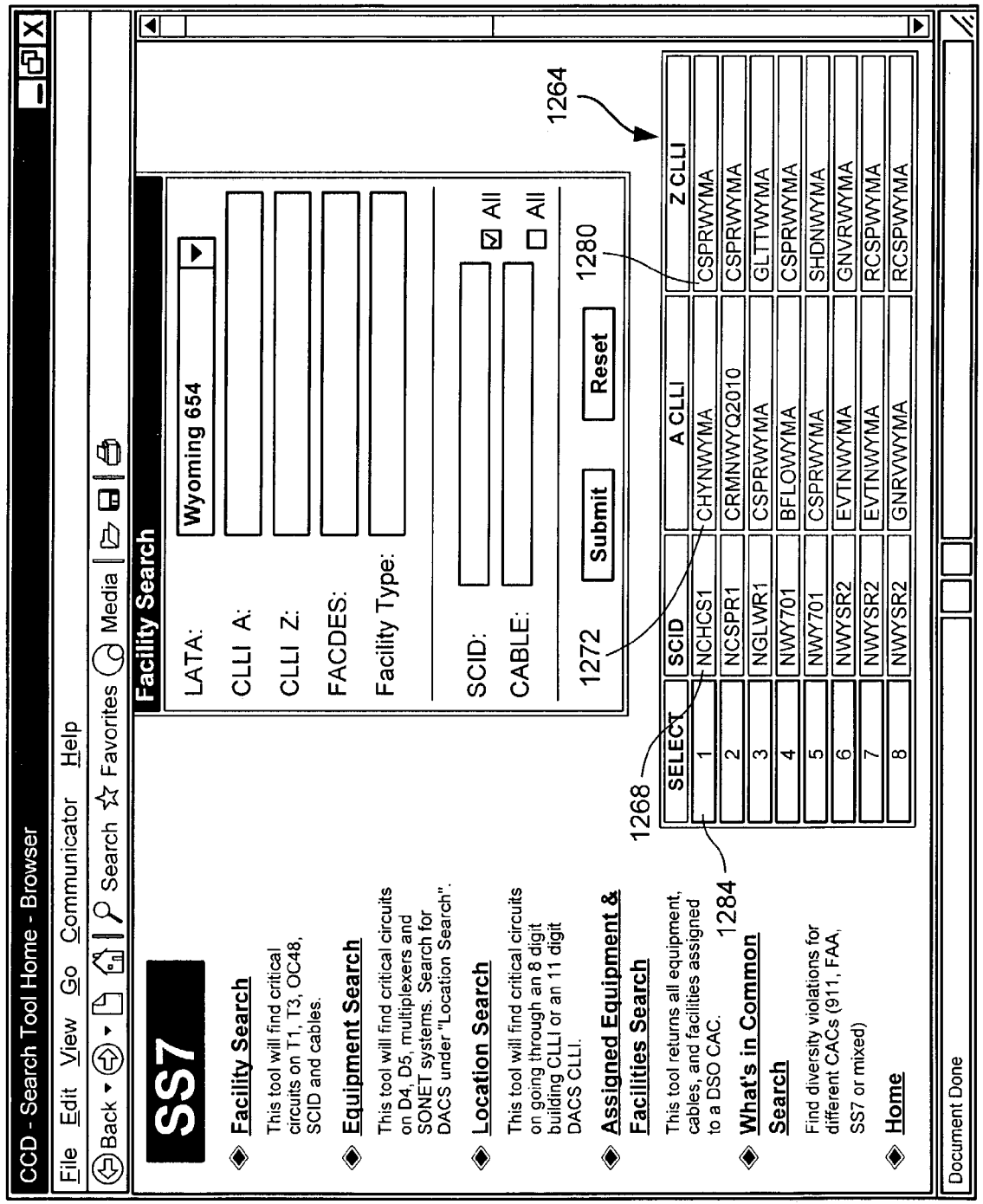

FIG. 12C illustrates an example screen display 1260 that can be used to display the results of such a facility search according to certain embodiments of the invention. After one or more search criteria have been submitted to the critical circuit application, perhaps in the fashion described above, the application can display a list of all resources associated with any critical circuits and meeting the specified criteria. For instance, in this example, the user has chosen to search for all SONET carriers associated with one or more critical circuits and located in the 654 LATA. Thus, the critical circuit application can display a listing of each such SONET carrier, as depicted, for instance, by table 1264.

Depending on the embodiment and the needs of the user, the search results can be displayed in a variety of fashions. Merely by way of example, in the illustrated embodiment, the telecommunication resources meeting the search criteria can be arranged into tables (e.g., 1264) for display. The critical circuit application can display any identifying information about each facility, such as a facility identifier (e.g., 1268), as well, optionally, as additional information that might be useful to the user, including, for example, the originating and ending locations (1272 and 1280, respectively) for each facility. The critical circuit application can also provide a way for the user to find out which critical circuits are associated with a particular facility, perhaps by using button 1284. Alternatively, facility identifier 1268 could comprise a hyperlink that could be selected to obtain more information about the circuits associated with that facility.

If a user chooses to view the critical circuits associated with a particular facility (for instance, by pressing button 1284), the critical circuit application can display the circuits, for example, as illustrated by example screen display 1288 on FIG. 12D. In this illustrated embodiment, each critical circuit associated with a particular facility is displayed can be displayed in a separate table 1292. (Note that, while example screen display 1292 shows only one associated circuit, there may be a plurality of such circuits associated with a particular facility, all of which can be displayed on screen display 1288 if desired). In this example, table 1292 contains information about the selected facility (collectively referred to by reference numeral 1296), as well as specific information about the critical circuit associated with that facility.

For instance, table 1292 can include an identifier (e.g., CAC code) 1300 for the critical circuit associated with the chosen resource, as well as notations indicating the customer 1304 and/or circuit layout order ("CLO") 1308. Generally, when a circuit is provisioned, provisioning system 216 will accomplish that task by way of a CLO. Thus, for a given circuit, the CLO can indicate the last provisioning action taken with respect to that circuit. In some embodiments, therefore, examination of the CLO for a given circuit (and, optionally, comparison with historical CLOs for that circuit) can provide an indication of when and/or how the circuit was last modified, or even whether a change is pending for that circuit. In certain embodiments, table 1292 can also include a long circuit identifier 1312, which can be assigned by provisioning system 212 and, as known to those skilled in the art, can be used to provide detailed identification information about the circuit. In some embodiments, since identifier 1300 can serve uniquely to identify the circuit, long identifier 1712 can be omitted.

Optionally, the critical circuit application can provide a way for users to obtain additional information about the selected resource or any associated critical circuit. For instance, in the illustrated embodiment, circuit identifier 1300 can be a hyperlink, which, if selected, can provide additional information about that critical circuit. Likewise customer identifier 1304 could be a hyperlink to additional information about that customer, for instance, contact information and/or a list of all other critical circuits provisioned for that customer, and CLO identifier 1308 could link to additional information about that CLO, such as the date the CLO was issued, the name of the party authorizing the CLO, the operations implemented by the CLO, and the like.

Figure 12E:
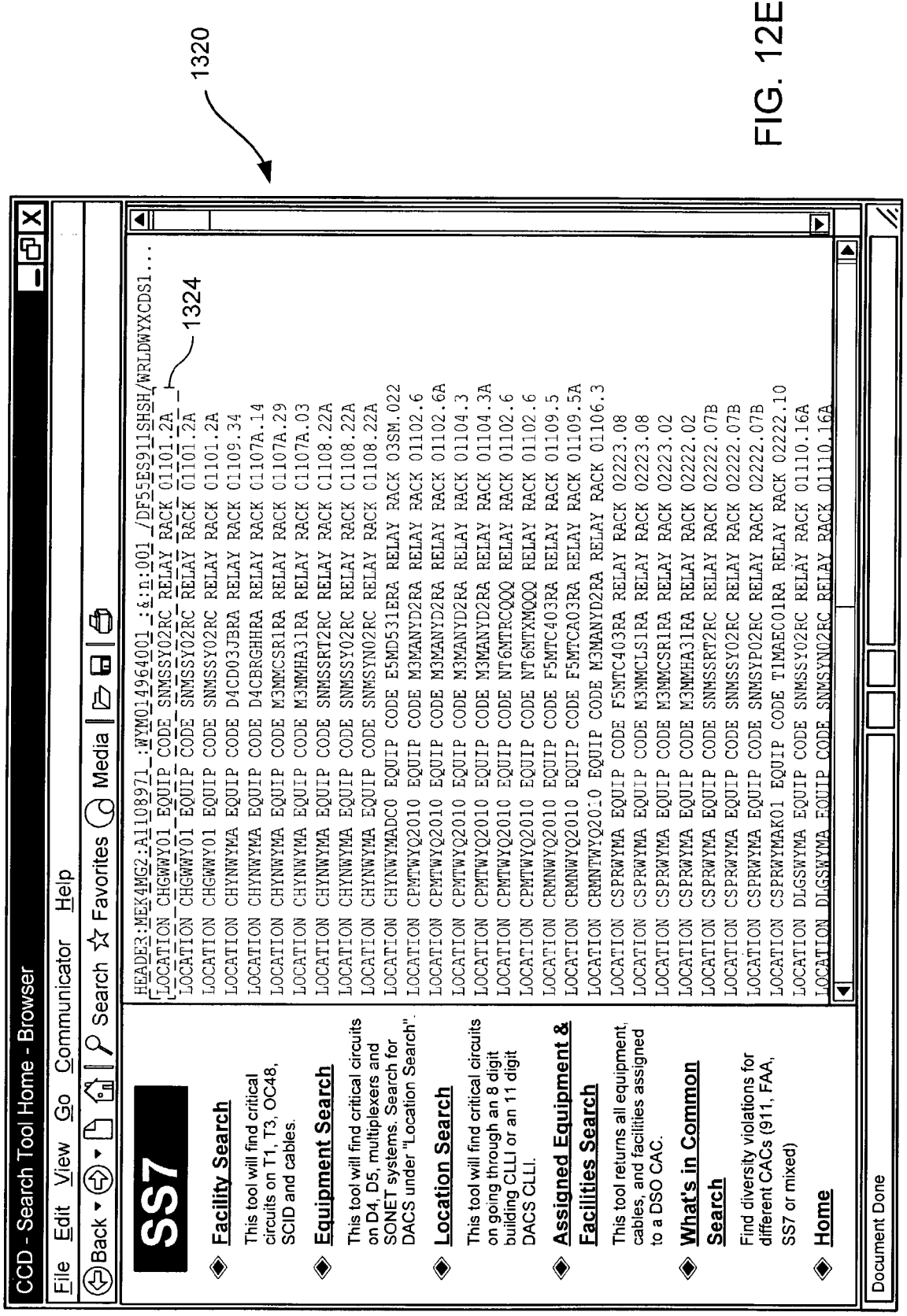
Figure 12F:
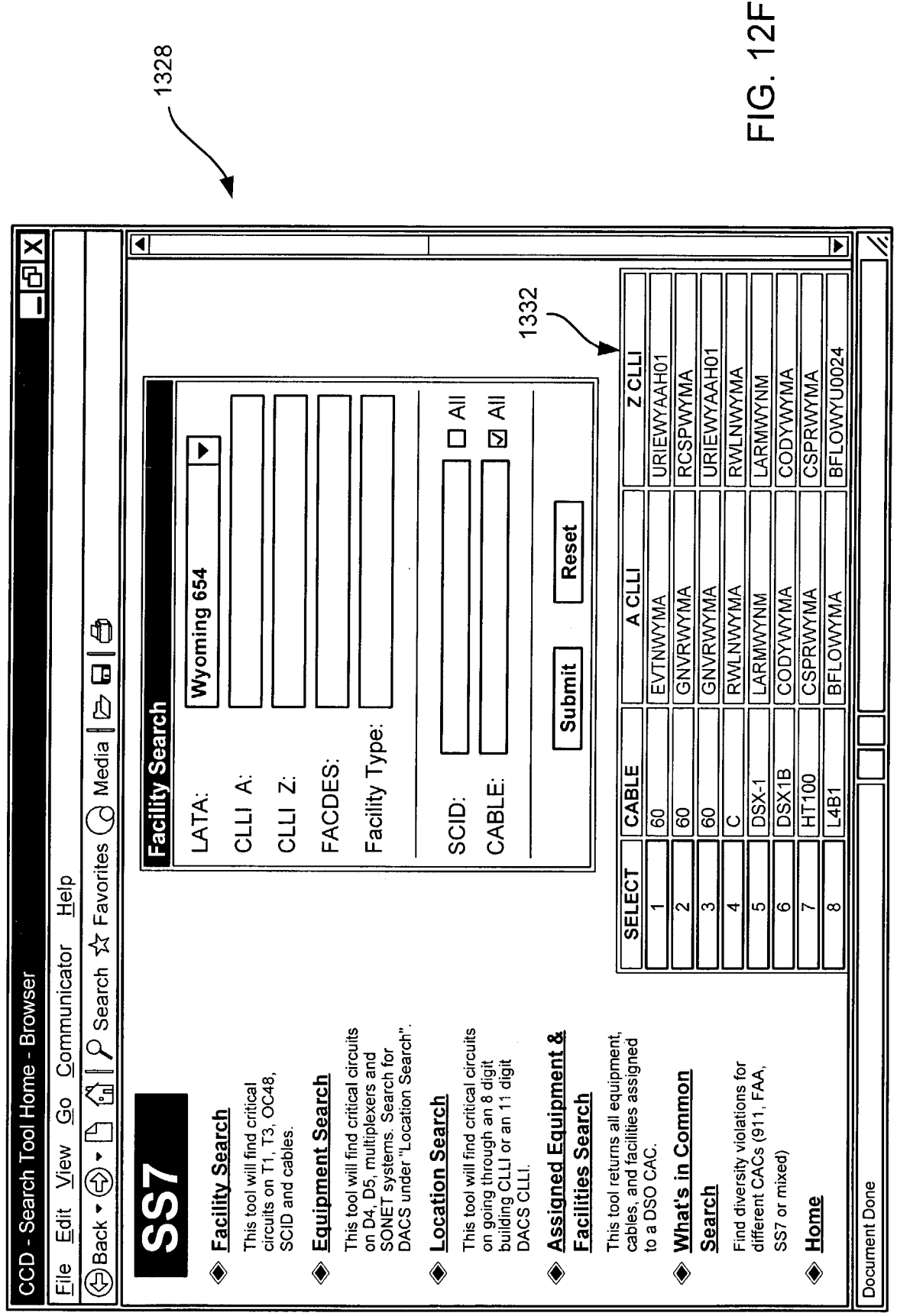

If the user selects one of these links, the critical circuit application can provide any necessary additional information. For instance, if user links to circuit identifier 1300, the critical circuit application can display information about that circuit, including all telecommunication resources associated with that circuit. Merely by way of example, FIG. 12E illustrates a circuit information window 1320 that can be used to identify and describe each of the telecommunication resources associated with a given critical circuit. Notably, each of the lines (e.g., 1324) in window 1320 can describe a different telecommunication resources, with identifying information that can vary according to the type of resources identified. Optionally, each line (e.g., 1324) can be a hyperlink, which, if selected, can link to information about that resource, including, for instance, the type of information described with reference to FIG. 12D. In this way, the critical circuit application can provide a way for users to navigate among critical circuits and associated telecommunication resources easily and quickly without having to return to a central search page.

Although the search process has been described thus far by reference to searching for facilities (and, in particular, SONET carriers), those skilled in the art will appreciate that such searching methods easily can be implemented for any other type of facility (and, for that matter, any other type of telecommunication resource) as well. For instance, FIG. 12F portrays an example display screen 1328 on which a user has chosen to search for all cables in a particular LATA. Accordingly, the user has been presented with a table 1332, from which the user can choose a particular cable for closer examination, for instance in the manner described above.

In other embodiments of the invention, the critical circuit application can be used to search for critical circuits associated with particular telecommunication equipment as well. For instance, FIG. 13 illustrates an example display screen 1340 that can be used to search for particular telecommunication equipment. According to the illustrated embodiment, the user can be presented with a selection window 1344 similar in some ways to that described above with respect to FIGS. 12A and 12B. While the presently-illustrated embodiment still can allow the user to select a particular LATA (e.g., using pull-down menu 1348), it also can present different search criteria more appropriate for searching telecommunication equipment. For instance, selection window 1344 can allow the user to choose a specific location (perhaps identified by CLLI code, ZIP code or other means), for instance using field 1352. In addition, the user can specify the type of equipment to search for, using field 1358. As described above, the user can be given the option to clear all entered information using button 1360, and the user can submit the search criteria to the critical circuit application, for instance by using button 1364.

Figure 13B:
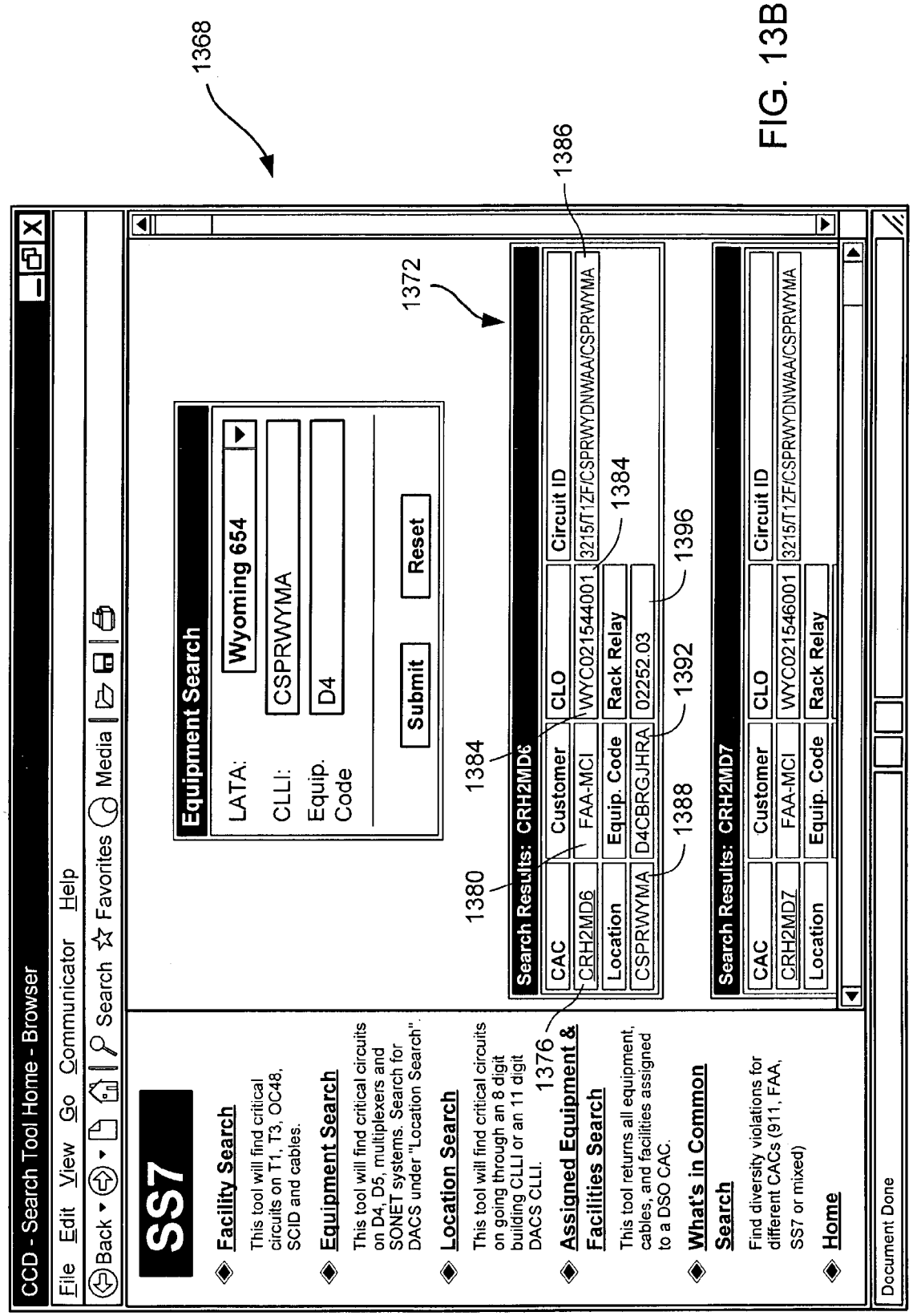
Figure 14A:
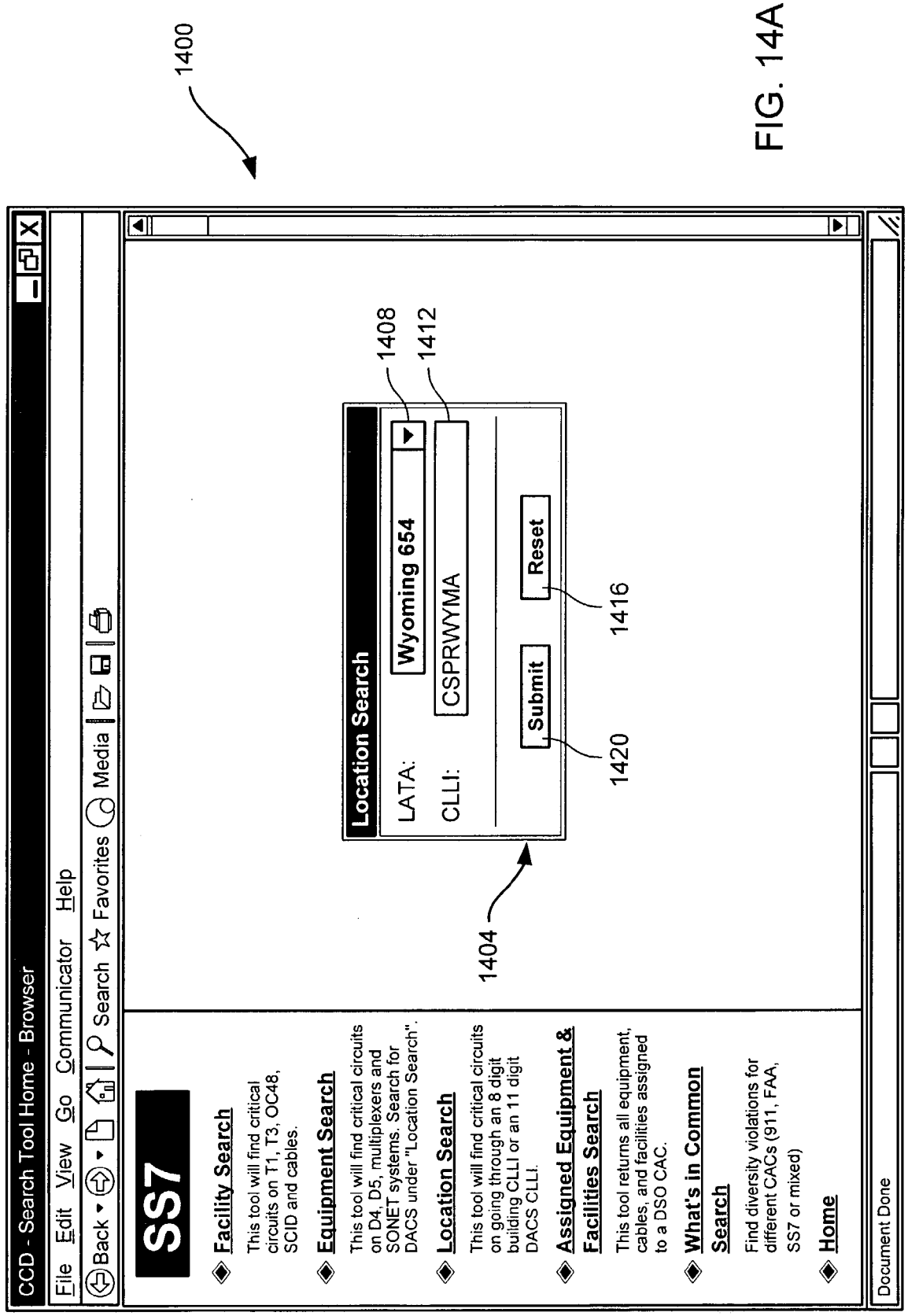
FIGS. 14 and 14B illustrate example screen displays that can be used to search for circuits associated with particular locations, according to certain embodiments of the invention.
Figure 14B:
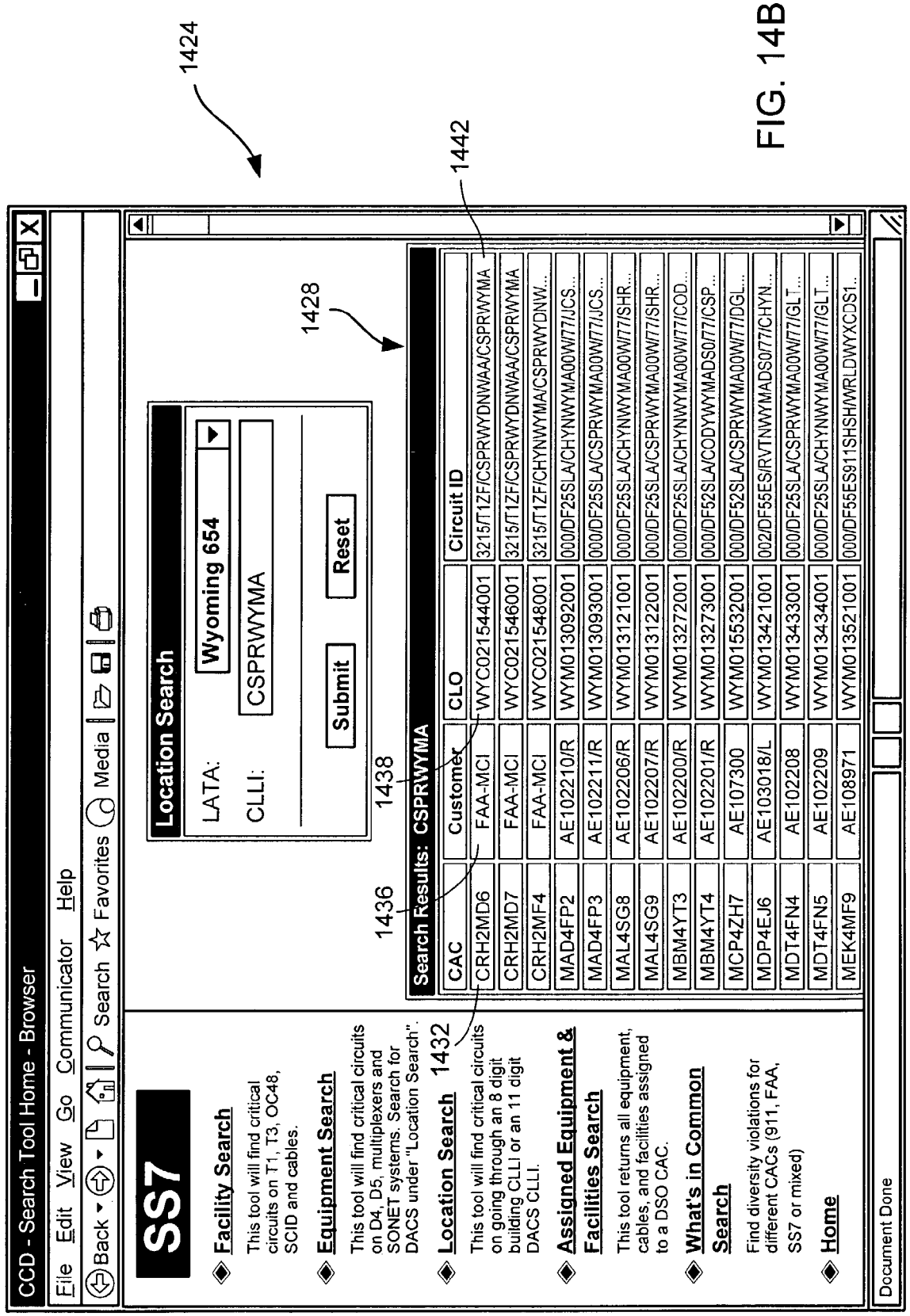

After search criteria are submitted, the critical circuit application can search critical circuit database 224 for all critical circuits associated with equipment meeting the search criteria and display a listing of all such equipment. FIG. 13B illustrates an example display screen that can be used to provide such a listing. In accordance with this embodiment, the critical circuit application can provide a table (e.g., 1372) for each critical circuit located by the search, similar to table 1292 discussed in connection with FIG. 12D. As discussed in detail above, table 1372 can contain information about the circuit, including a circuit identifier 1376, a customer identifier 1380, a CLO identifier 1384, and a long circuit identifier 1386. Likewise, table 1372 can contain information about the equipment meeting the search criteria and associated with that circuit, including a location identifier (e.g., CLLI code) 1388, as well as an equipment identifier 1392 and, optionally, a rack identifier 1396. Those skilled in the art will appreciate that rack identifier 1396 can be used facilitate finding a piece of telecommunication equipment at a particular location by specifying the rack in which that equipment is mounted. Those skilled in the art will further recognize that, in some embodiments, the relay rack can be considered a telecommunication resource to be used in determining circuit diversity according to the methods described above.

Also similar to the embodiment discussed above, each of the entries 1376, 1380, 1384, 1386, 1388, 1392, 1396 in table 1372 can link to additional information. For instance, in certain embodiments, the selection of circuit identifier 1376 can prompt the critical circuit application to display information about that circuit, including for instance a list of telecommunication resources associated with that circuit similar to that depicted by FIG. 12E. Likewise, selecting equipment identifier 1392 could prompt the critical circuit application to display information about that equipment, including perhaps the manufacturer, date of manufacture and/or service, any maintenance history, as well as a list of all critical circuits associated with that equipment. Such information could be obtained from critical circuit database 224, provisioning database 216 or any other data source. In similar fashion, selecting location identifier 1388 could invoke a screen detailing information about that location, including the address of the location, a list of contacts for that location, and a list of all critical circuits and/or telecommunication resources associated with that location. Those skilled in the art will recognize that any of the other elements of table 1372 (or, for that matter, table 1292 shown on FIG. 12D), can comprise links to appropriate additional information.

According to other embodiments, a user can search for all critical circuits and/or telecommunication resources at a given location. As illustrated on FIG. 14A, example screen display 1400 can be used to perform such searches according to certain embodiments of the invention. Display 1400 can include a selection window 1404, including a LATA selection field 1408 similar to that described above, as well as a location field 1412, where the user can identify one or more locations to be searched. In one aspect, the location identifier can be a CLLI code as described above, but locations can also be identified by a variety of other methods known to those skilled in the art, including ZIP codes, street addresses and the like. Selection window can also include a reset button 1416 and a submit button 1420, which can function similarly to those described above.

Also in a manner similar to that described above, after the user submits the search criteria, the critical circuit application can search critical circuit database 224 for circuits matching the criteria. As illustrated by example display screen 1424 of FIG. 14B, such information can, in accordance with certain embodiments, be formatted as a table 1428. For each circuit meeting the search criteria, table 1428 can contain identifying or descriptive information, including a circuit identifier 1432, a customer identifier 1436, a CLO identifier, and perhaps a long circuit identifier 1442, each of which has been described above. In certain embodiments, each of these also can link to additional information in the manner already discussed.

Figure 15A:
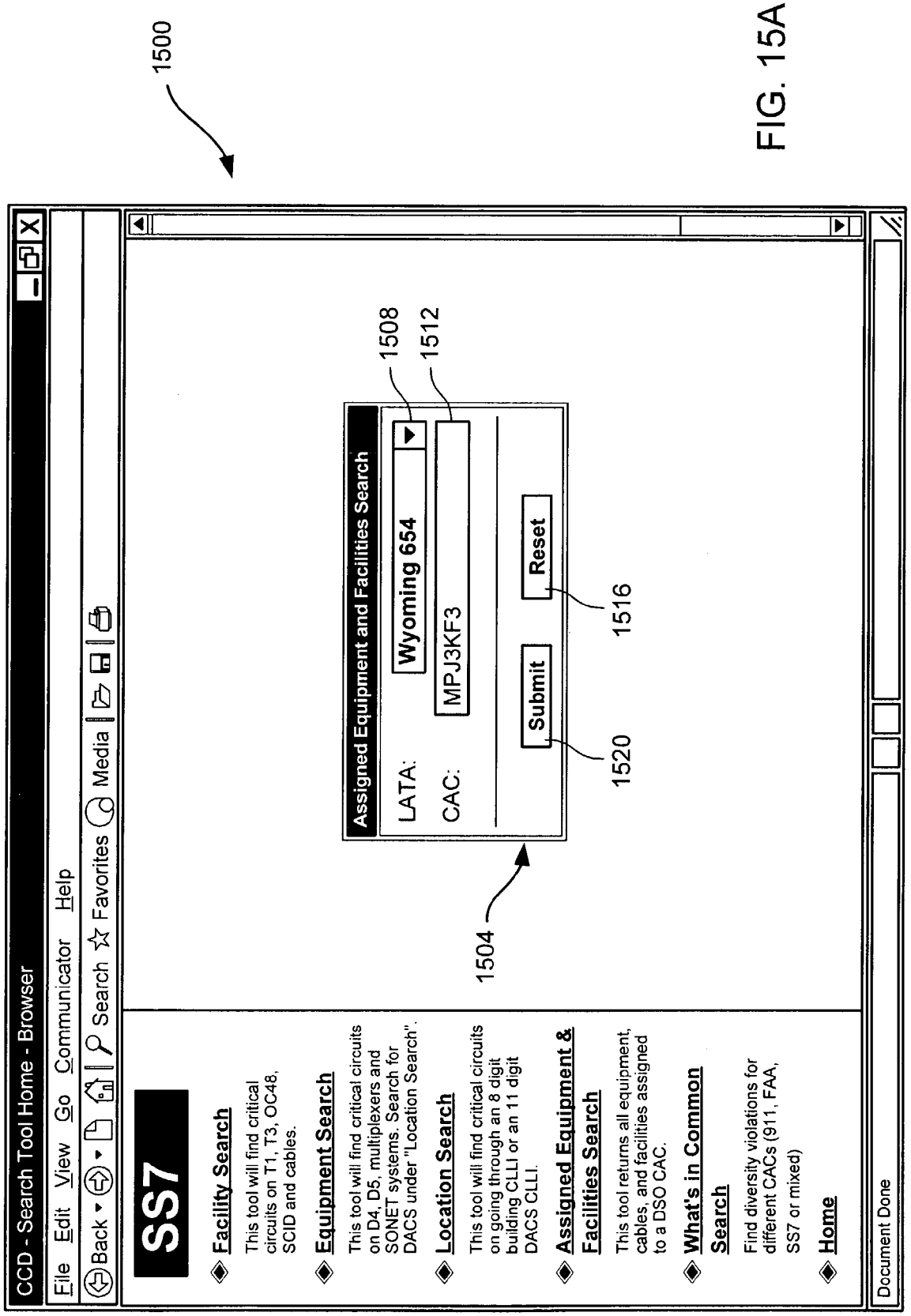

In one set of embodiments, the invention also can allow a user to search for all telecommunication resources associated with a given circuit or set of circuits. By way of example, FIG. 15A illustrates an example screen display 1500 that can be used to perform such searches. Display screen 1500 features selection window 1504, which includes LATA field 1508 similar to those described above, along with circuit identifier field 1512, where the user can enter one or more circuit identifiers (e.g., CAC codes) to be searched. Selection window 1504 also can include a reset button 1516 with a function similar to those described above. When a user submits the search criteria (for instance, using button 1520), the critical circuit application can search critical circuit database 224 for circuits meeting the criteria and display information about such circuits, including a listing of all associated telecommunication resources.

FIG. 15B illustrates an example display screen 1524 that can be used to display this information according to certain embodiments of the invention. In the illustrated embodiment, each circuit meeting the search criteria can be displayed in a separate table (e.g., 1528), although those skilled in the art will recognize that the display format of the data on screen 1524, as on the other screens described in this application, is discretionary. Table 1528 can include information about the circuit, including the circuit identifier 1532, customer identifier 1536, CLO identifier 1540 and long circuit identifier 1544, each of which is discussed in detail above, and each of which can link to additional information (also as described above).

In addition, table 1528 can include information about each telecommunication resource associated with a particular circuit, such as the information displayed in window 1548. (Notably, a table similar to table 1528 also can be displayed whenever a user selects a hyperlinked circuit identifier in the embodiments discussed above.) Also as discussed above, each entry in table 1548 can comprise a hyperlink that, when selected, can link to additional information about that particular resource.

In certain embodiments, the critical circuit application can filter the information in window 1548, so that a user can choose to view only a subset of that information (e.g., only certain types of resources or resources in certain locations). In other embodiments, the information in window 1548 can be sorted. Merely by way of example, those skilled in the art will recognize that in some embodiments, column headers can be provided in window 1548 (or in any of the other information windows described in this application), such that selecting a column header will cause the information in window 1548 to be sorted according to that column.

Figure 16:
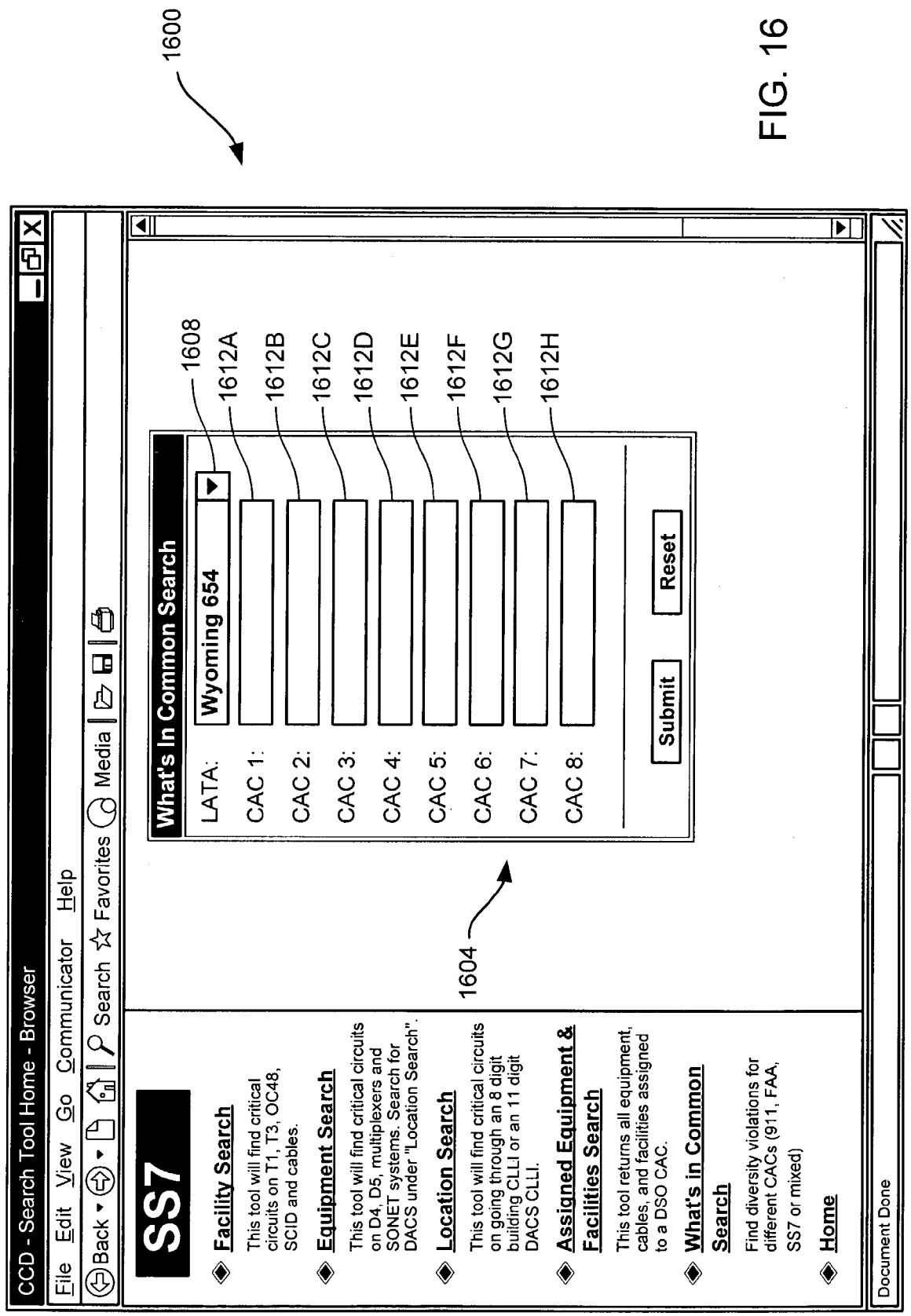
FIG. 16 illustrates an example screen display that can be used to search for telecommunication resources shared by one or more critical circuits, according to certain embodiments of the invention.

In yet another embodiment, the invention provides the ability for a user to search for resources associated with each of a plurality of circuits. In certain respects, this feature of the invention is similar to that described in relation to FIGS. 15A and 15B above, except that the search results will include only those resources shared by the identified circuits, instead of the entire set of resources associated with each circuit. FIG. 16 depicts an example screen display 1600 that can be used to perform such searches according to certain embodiments of the invention. Screen 1600 includes a selection window 1604 that can allow a user to select a LATA (e.g. using field 1608) if desired, as wells as multiple fields 1612A–1612H that can be used to provide circuit identifiers as search criteria. Those skilled in the art will recognize that, while eight circuit input fields have been provided in this illustrative embodiment, the number of such fields is discretionary. Moreover, not all fields need be populated by the user; as few as one circuit can be specified as a search criterion, in such a case, the search will proceed similarly to the search exemplified by FIGS. 15A and 15B.

After the search criteria have been submitted, the critical circuit application can search for any telecommunication resources common to all of the specified circuits and display a listing of such resources, perhaps using one of the display methods discussed herein. Those skilled in the art will appreciate that this type of search has many applications and provides several benefits. For instance, if two or more circuits fail simultaneously, one can quickly search to find out whether a single telecommunication resource could be responsible for the multiple failures. Alternatively, this search feature could be used to perform ad hoc diversity analyses.

Moreover, this embodiment can be used to undertake a "common point of failure" analysis. For instance, if two circuits in a network have failed, a user can search for any resources that the two circuits share in common, and any such shared resources can be considered a common point of failure. This common point of failure can be prioritized (i.e., analyzed ahead of other potential points of failure) in attempting to diagnose and remedy the circuit failures, since it is more likely that a single malfunctioning resource would cause the simultaneous failure than two (or more) discrete problems in the network.

Similarly, such an analysis can be used prospectively to catalog common points of failure. For instance, any information about common points of failure found by implementing this embodiment of the invention could be stored in a database (either critical circuit database 224 or another database) for future reference. Thus, if two or more circuits were to fail, the stored information could be consulted (for instance, if the critical circuit application were for some reason unavailable to perform a search at that time). Similarly, any of the stored information described above could be stored (either in critical circuit database 224 or in another database) for off-line access in the event the critical circuit application were unavailable.

In conclusion, the present invention provides novel systems and methods for analyzing critical circuits, including evaluating the diversity of such circuits. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for analyzing the diversity of critical telecommunication circuits, the system comprising:
    a first database comprising information about a plurality of telecommunication circuits, wherein the plurality of circuits includes a set of critical circuits comprising two or more complete critical circuits that perform the same critical function selected from the group consisting of emergency services network circuits, air traffic control system network circuits, and Signaling System 7 ("SS7") network circuits ("critical circuit set");
a computer in communication with the first database, wherein the computer has instructions executable to analyze the diversity of the set of complete critical circuits;
wherein the critical circuit set comprises at least a first complete critical circuit and a second complete critical circuit which perform the same critical function, and wherein analyzing the diversity of the set of complete critical circuits comprises:
identifying a first set of telecommunication resources associated with the first complete critical circuit;
identifying a second set of telecommunication resources associated with the second complete critical circuit; and
comparing the identified telecommunication resources associated with each complete critical circuit to determine whether the critical circuit set is diverse.

2. The system of claim 1, wherein the instructions are further executable to:
determine that the critical circuit set is diverse if the first and second sets of telecommunication resources do not share any common resources.

3. The system of claim 1, wherein the instructions are further executable to:
determine that the critical circuit set is not diverse if the first and second sets of telecommunication resources do share any common resources.

4. The system of claim 1, wherein at least one of the identified telecommunication resources is selected from a group consisting of a telecommunication facility, a fiber-optic cable, a radio link, a digital cross-connect system, a multiplexer, a Synchronous Optical NETwork ("SONET") link, a channel bank, a physical location and a power supply.

5. The system of claim 1, wherein:
identifying a first set of telecommunication resources comprises:
accessing the first database;
searching the first database for a first record comprising a first set of information about the first critical circuit; and
using the first set of information to identify a set of associated telecommunication resources; and
identifying a second set of telecommunication resources comprises:
accessing the first database;
searching the first database for a second record comprising a second set of information about the second critical circuit; and
using the second set of information to identify the second set of telecommunication resources.

6. The system of claim 5, further comprising a second database in communication with the computer and capable of storing information about the critical circuit set, wherein the instructions are further executable to: store the information about the first and second critical circuits in the second database.

7. The system of claim 1, wherein the instructions are further executable to periodically analyze the diversity of the set of critical circuits.

8. The system of claim 1, wherein the critical circuit set comprises more than two critical circuits.

9. The system of claim 8, wherein determining whether the circuit set is diverse comprises:
identifying the circuit set as diverse if none of the circuits in the circuit set share any common resources with any other circuit in the circuit set.

10. The system of claim 8, wherein determining whether the circuit set is diverse comprises:
identifying the circuit set as diverse if any two circuits in the circuit set share no common resources.

11. A computer-implemented method for analyzing the diversity of critical telecommunication circuits, the method comprising:
identifying a critical circuit set comprising a first complete critical circuit and a second complete critical circuit which perform the same critical function;
identifying a first set of telecommunication resources associated with the first complete critical circuit;
identifying a second set of telecommunication resources associated with the second complete critical circuit; and
comparing the first set of telecommunication resources with the second set of telecommunication resources to determine whether the critical circuit set is diverse,
wherein said first and second critical circuits are selected from the group consisting of emergency services network circuits, air traffic control system network circuits, and Signaling System 7 ("SS7") network circuits.

12. The method of claim 11, wherein the first and second sets of telecommunication resources comprise resources selected from a group consisting of a telecommunication facility, a fiber-optic cable, a radio link, a digital cross-connect system, a multiplexer, a Synchronous Optical NETwork ("SONET") link, a channel bank, a physical location and a power supply.

13. The method of claim 11, the method further comprising:
determining that the critical circuit set is diverse if the first and second sets of telecommunication resources do not share any common resources.

14. The method of claim 11, the method further comprising:
determining that the critical circuit set is not diverse if the first and second sets of telecommunication resources do share any common resources.

15. The method of claim 14, wherein, if the critical circuit set is determined not to be diverse, the method further comprises performing an action to remedy the diversity violation.

16. The method of claim 15, wherein the action is selected from a group consisting of sending an electronic message to a technician, electronically re-provisioning at least one of the circuits in the critical circuit set, electronically updating a provisioning database, and suggesting alternative telecommunication resources for at least one of the critical circuits.

17. The method of claim 11, wherein:
identifying a first set of telecommunication resources comprises:
accessing a first database;
searching the first database for a first record comprising a first set of information about the first critical circuit; and
using the first set of information to identify a set of associated telecommunication resources; and
identifying a second set of telecommunication resources comprises:
accessing the first database;
searching the first database for a second record comprising a second set of information about the second critical circuit; and using the second set of information to identify the second set of telecommunication resources.

18. The method of claim 17, further comprising storing the information about the first and second critical circuits in a second database.

19. The method of claim 18, further comprising periodically repeating the steps of determining a critical circuit set, identifying a first set of telecommunication resources, identifying a second set of telecommunication resources, comparing the first and second sets of telecommunication resources, and storing the information about the first and second critical circuits.

20. The method of claim 19, further comprising tracking statistical data about the diversity of the critical circuit set.

21. The method of claim 11, further comprising producing a report detailing whether the critical circuit set is diverse, wherein if the critical circuit set is determined not to be diverse, the report identifies each shared telecommunication resource.

22. A method of analyzing the diversity of critical telecommunication circuits, the method comprising:
   determining a critical circuit set comprising at least two complete critical circuits which perform the same critical function;
   inputting identification information about each of the two complete critical circuits into a computer, wherein the computer comprises a computer readable medium including instructions executable by the computer to perform a process comprising:
   searching a first database for resource information about each of the two complete critical circuits, wherein the resource information includes the identity of telecommunication resources associated with each of the complete critical circuits; and
   comparing the identities of the resources associated with each of the complete critical circuits,
   wherein each of the complete critical circuits are selected from the group consisting of emergency services network circuits, air traffic control system network circuits, and Signaling System 7 ("SS7") network circuits.

23. The method of claim 22, wherein the resource information is stored in a second database in communication with the computer.

24. The method of claim 22, the process further comprising:
   identifying the critical circuit set as non-diverse if any of the compared resources are the same.

25. The method of claim 24, the process further comprising:
   identifying the critical circuit set as diverse if none of the compared resources are the same.

26. The method of claim 25, the process further comprising:
   producing a report detailing whether the circuit set is diverse, wherein if the circuit set is not diverse, the report identifies each common resource associated with both of the critical circuits.

27. The method of claim 22, wherein the computer comprises further instructions executable to check the identification information for errors.

28. The method of claim 22, wherein the computer comprises further instructions executable to repeat the process periodically.

29. The method of claim 22, wherein the critical circuit set comprises more than two critical circuits.

30. The method of claim 29, the method further comprising:
   determining whether the circuit set is diverse, based on the compared resources.

31. The method of claim 30, wherein determining whether the circuit set is diverse comprises:
   identifying the circuit set as diverse if none of the circuits in the circuit set share any common resources with any other circuit in the circuit set.

32. The method of claim 30, wherein determining whether the circuit set is diverse comprises:
   identifying the circuit set as diverse if any two circuits in the circuit set share no common resources.

* * * * *